United States Patent
Keimatsu

(10) Patent No.: US 10,318,506 B2
(45) Date of Patent: Jun. 11, 2019

(54) DATABASE SYSTEM

(71) Applicant: NEC Corporation, Minato-ku, Tokyo (JP)

(72) Inventor: Akitsugu Keimatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 520 days.

(21) Appl. No.: 15/065,003

(22) Filed: Mar. 9, 2016

(65) Prior Publication Data

US 2016/0275191 A1   Sep. 22, 2016

(30) Foreign Application Priority Data

Mar. 18, 2015   (JP) .................................. 2015-055069

(51) Int. Cl.
*G06F 17/30* (2006.01)
*G06F 16/22* (2019.01)
*G06F 16/25* (2019.01)

(52) U.S. Cl.
CPC .......... *G06F 16/221* (2019.01); *G06F 16/252* (2019.01)

(58) Field of Classification Search
CPC . G06F 17/30315; G06F 16/221; G06F 16/252
USPC ........................................................ 707/722
See application file for complete search history.

(56) References Cited

U.S. PATENT DOCUMENTS

| | | | |
|---|---|---|---|
| 2005/0203888 A1* | 9/2005 | Woosley ........... | G06F 17/30554 |
| 2008/0059408 A1* | 3/2008 | Barsness .......... | G06F 17/30545 |
| 2013/0144867 A1* | 6/2013 | Tanaka .............. | G06F 17/30486 |
| | | | 707/718 |
| 2014/0172908 A1* | 6/2014 | Konik ............... | G06F 17/30477 |
| | | | 707/769 |
| 2015/0112965 A1* | 4/2015 | Tokuda ............. | G06F 17/30463 |
| | | | 707/718 |
| 2015/0112966 A1* | 4/2015 | Tokuda ............. | G06F 17/30463 |
| | | | 707/718 |

FOREIGN PATENT DOCUMENTS

JP            4428488 B2    12/2000
WO     2012/121316 A1     9/2012

* cited by examiner

*Primary Examiner* — Joshua Bullock

(57) ABSTRACT

A database system comprising: a client that executes a query to a database server; and the database server that, according to a query from the client, transmits a table of an execution result of the query, the table representing an answer to each query as a record and including the record; wherein the database server comprises a data transmission part which, in a case of transmission of the table of the execution result having a plurality of columns, performs the transmission for each column of the table of the execution result by using any of a plurality of data structures being capable of representing the column.

8 Claims, 21 Drawing Sheets

DATABASE SYSTEM 3

Fig.3

ORDERED SET 2411

VALUE NUMBER/VALUE LIST 2412

| idx | ORDERED SET |
|---|---|
| 0 | 1 |
| 1 | 2 |
| 2 | 0 |

| idx | VALUE NUMBER |
|---|---|
| 0 | 0 |
| 1 | 2 |
| 2 | 1 |

| idx | VALUE LIST |
|---|---|
| 0 | X |
| 1 | Y |
| 2 | Z |

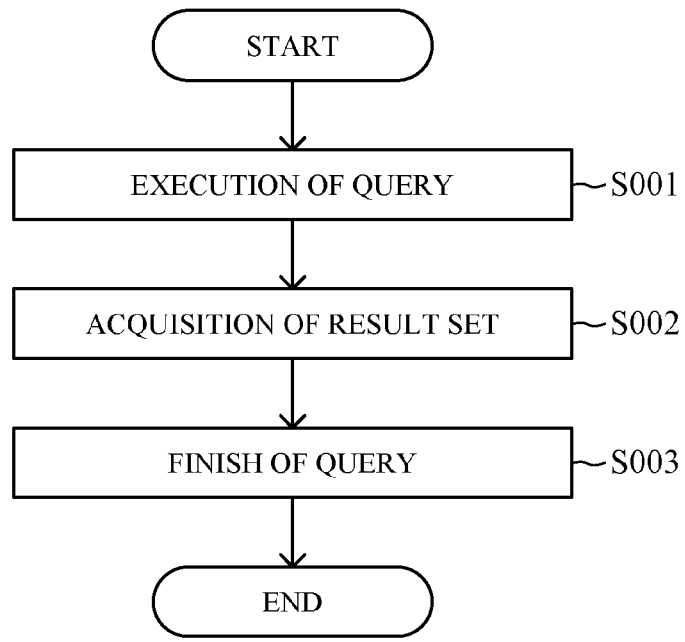

Fig.7

CUSTOMER TABLE

| LINE NUMBER | CUSTOMER ID | FAMILY NAME | FIRST NAME | ... | PREFECTURE | REGISTRATION DATE | UPDATE DATE |
|---|---|---|---|---|---|---|---|
| 0 | C000000 | ○○ | △△ | | WAKAYAMA PREFECTURE | 2000-01-02 | 2010-01-06 |
| 1 | C000001 | □□ | ×× | | AKITA PREFECTURE | 2000-01-02 | 2011-04-07 |
| 2 | C000002 | ●● | ☆☆ | | CHIBA PREFECTURE | 2000-01-04 | 2009-08-18 |
| ... | | | | ... | | | |
| 999999 | C999999 | ▽▽ | ** | | AICHI PREFECTURE | 2013-07-25 | 2013-07-25 |

[FAST STRUCTURE]

| idx | ORDERED SET |
|---|---|
| 0 | 0 |
| 1 | 1 |
| ... | ... |
| 999999 | 999999 |

| idx | VALUE NUMBER |
|---|---|
| 0 | 0 |
| 1 | 1 |
| ... | ... |
| 999999 | 999999 |

| idx | VALUE LIST |
|---|---|
| 0 | C000000 |
| 1 | C000001 |
| ... | ... |
| 999999 | C999999 |

⎫
⎬ CUSTOMER ID
⎭

| idx | VALUE NUMBER |
|---|---|
| 0 | 46 |
| 1 | 2 |
| ... | ... |
| 999999 | 0 |

| idx | VALUE LIST |
|---|---|
| 0 | AICHI PREFECTURE |
| 1 | AOMORI PREFECTURE |
| ... | ... |
| 46 | WAKAYAMA PREFECTURE |

⎫
⎬ PREFECTURE
⎭

[COST OF VALUE NUMBER/VALUE LIST]=

NUMBER OF ELEMENT OF ORDERED SET x NUMBER OF BYTE OF TYPE OF VALUE NUMBER +
TOTAL NUMBER OF BYTE OF VALUE LIST

=5,000 x 4 (UNIT TYPE) + 8,000,000 = 8,020,000

[COST OF VALUE ARRAY]=

NUMBER OF ELEMENT OF ORDERED SET x TOTAL NUMBER OF BYTE OF
VALUE LIST / NUMBER OF ELEMENT OF VALUE LIST

=5,000 x 8,000,000 / 1,000,000 = 40,000

} ADOPT VALUE ARRAY

[COST OF VALUE NUMBER/VALUE LIST]=

NUMBER OF ELEMENT OF ORDERED SET x NUMBER OF BYTE OF TYPE OF VALUE NUMBER + TOTAL NUMBER OF BYTE OF VALUE LIST

=5,000 x 1 (UCHAR TYPE) + 337 = APPROXIMATELY 5,000

ADOPT VALUE LIST/ VALUE NUMBER

[COST OF VALUE ARRAY]=

NUMBER OF ELEMENT OF ORDERED SET x TOTAL NUMBER OF BYTE OF VALUE LIST / NUMBER OF ELEMENT OF VALUE LIST

=5,000 x 337 / 47 = APPROXIMATELY 36,000

FROM nTH CASE TO n+m-1TH CASE

CUSTOMER ID

FROM nTH CASE TO n+m-1TH CASE

Fig.19
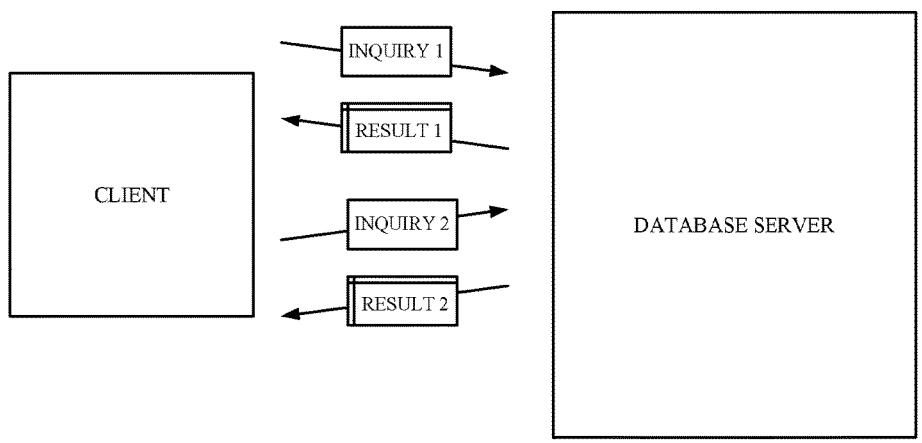
RESULT SET 1 OF INQUIRY 1
| LINE NUMBER | CUSTOMER ID | PREFECTURE |
|---|---|---|
| 0 | C000000 | WAKAYAMA PREFECTURE |
| 1 | C000001 | AKITA PREFECTURE |
| 2 | C000002 | CHIBA PREFECTURE |
RESULT SET 2 OF INQUIRY 2
| LINE NUMBER | FAMILY NAME AND FIRST NAME | PREFECTURE |
|---|---|---|
| 0 | □□×× | AKITA PREFECTURE |
| 1 | **$$ | KANAGAWA PREFECTURE |
| 2 | ●●☆☆ | CHIBA PREFECTURE |
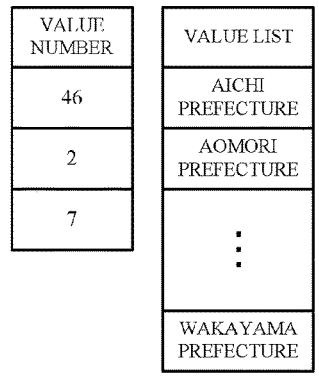
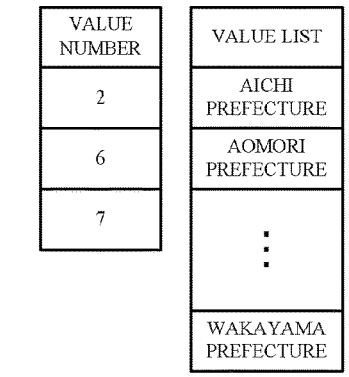
BOTH REFER TO VALUE LIST OF IDENTICAL TABLE

| VALUE LIST ID | REFERENCE FREQUENCY (INCREMENTED BY DIFFERENT CONNECTION) | PERPETUATION FLAG | STORAGE PLACE OF VALUE LIST |
|---|---|---|---|
| AF6CD542... | 1 | FALSE | |
| 302CD641... | 75 | TRUE | /var/cache/xxx/302C... |
| 972BC735... | 4 | TRUE | /var/cache/xxx/972B... |
| ⋮ | | | |
| D2690B43... | 2 | FALSE | |

8

DATABASE SYSTEM

INCORPORATION BY REFERENCE

The present invention is based upon and claims the benefit of priority from Japanese patent application No. 2015-055069, filed on Mar. 18, 2015, the disclosure of which is incorporated herein in its entirety by reference.

TECHNICAL FIELD

The present invention relates to a column-oriented database system, a database server, an information processing method, and a program.

BACKGROUND ART

A column-oriented database is known, wherein each column of a table is stored as a block of data. In the column-oriented database, data is put together in column direction. As a result, the column-oriented database has an advantage to perform such as tabulation processing at high speed, and thereby the column-oriented database is utilized for batch processing to perform batch update of mass data, tabulation or analysis of mass data.

Besides, a column-oriented database having a FAST (Filter Array Structure) structure is known. In the FAST structure, data is managed by decomposition into, for example, order, a position and a value, and thereby processing performance in a server is excellent.

As a technology of a column-oriented database having the FAST structure, for example, Patent Document 1 is known. In the Patent Document 1, a CPU having a table extractor, a value list converter, a pointer processor, and an information block controller, is described. According to the Patent Document 1, a value list of an information block taken out by the information block controller is referred to by the table extractor, and a value list to be shared is extracted. Subsequently, the value list convertor inserts an item value into a value list for which conversion of an item value is required. Then, the pointer processor converts a pointer value and generates another required pointer array. By such processing, a plurality of tables shown by the FAST structure can be combined according to the Patent Document 1.

Besides, in a field of database, a distributed storage system is known, wherein data is distributed and stored in a plurality of data nodes. As a technology using the distributed storage system, for example, Patent Document 2 is known. In the Patent Document 2, a distributed storage system having at least two data nodes is described, wherein a data structure of each of the data nodes is logically the same but physically different. According to the Patent Document 2, by having such a configuration, a quick response can be performed to an application of which characteristic of utilizing form of data is different, and thereby decreasing of response performance can be avoided.

Patent Document 1: JP 4428488 B2
Patent Document 2: WO 2012/121316 A1

SUMMARY

However, when the FAST structure described in the Patent Document 1 is used, there is a case requiring transmission of a vast value list to secure data consistency. As a result of this, a problem of increasing network traffic occurs. There is a possibility that a similar problem occurs in the Patent Document 2.

Concerning this problem, a coping method is known, wherein data is converted from the FAST structure into a line-oriented data structure and transmitted to a client, and thereby unnecessary transmission of data is prevented. However, there is a case that duplicate data is transmitted when the data is converted into the line-oriented data structure. As described, there is a case that it is difficult to prevent increase of network traffic even if data is converted into the line-oriented data structure.

As described, in the column-oriented database, a problem of difficulty to prevent increase of network traffic between a server and a client occurs.

Therefore, an exemplary object of the present invention is to provide a database system capable of solving the above-described problem, that is, a problem that it is difficult to prevent increase of network traffic between a server and a client in the column-oriented database.

To achieve the object, a database system as an aspect of the present invention configured to include:

a client that executes a query to a database server; and
the database server that, according to a query from the client, transmits a table of an execution result of the query, the table representing an answer to each query as a record and including the record; wherein
the database server comprises a data transmission part which, in a case of transmission of the table of the execution result having a plurality of columns, performs the transmission for each column of the table of the execution result by using any of a plurality of data structures being capable of representing the column.

Further, a database server, which is another aspect of the present invention that, according to a query from a client, transmits a table of an execution result of the query, the table representing an answer to each query as a record and including the record, the database server is configured to include a data transmission part which, in a case of transmission of the table of the execution result having a plurality of columns, performs the transmission for each column of the table of the execution result by using any of a plurality of data structures being capable of representing the column.

Further, an information processing method, which is another aspect of the present invention is configured to include, when performing transmission of a table of an execution result of the query, according to a query from a client, the table representing an answer to each query as a record and including the record and comprising a plurality of column items, performing the transmission for each column of the table of the execution result by using any of a plurality of data structures being capable of representing the column.

Further, a non-transitory computer-readable medium storing a program being another aspect of the present invention comprising instructions for causing a database server that, according to a query from a client, transmits a table of an execution result of the query, the table representing an answer to each query as a record and including the record, to realize:

a data transmission unit which, in a case of transmission of the table of the execution result having a plurality of columns, performs the transmission for each column of the table of the execution result by using any of a plurality of data structures being capable of representing the column.

By the configuration described above, the present invention is able to provide a database system capable of solving the problem that it is difficult to prevent increase of the network traffic between a server and a client in the column-oriented database.

BRIEF DESCRIPTION OF DRAWINGS

FIG. 3 is a diagram to explain a FAST structure;

FIG. 6 is a flowchart to explain an entire operation of a database system;

FIG. 7 is a diagram showing an example of a table stored in a database server;

FIG. 19 is a diagram showing an outline of a database system according to a second exemplary embodiment of the present invention;

EXEMPLARY EMBODIMENTS

<First Exemplary Embodiment>

Figure 1:
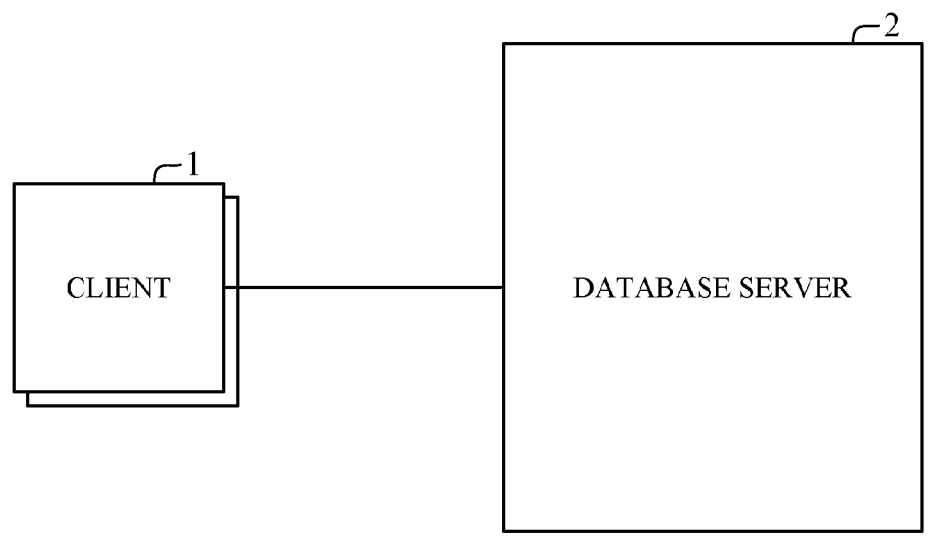
FIG. 1 is a block diagram showing a whole configuration of a database system according to a first exemplary embodiment of the present invention.
Figure 2:
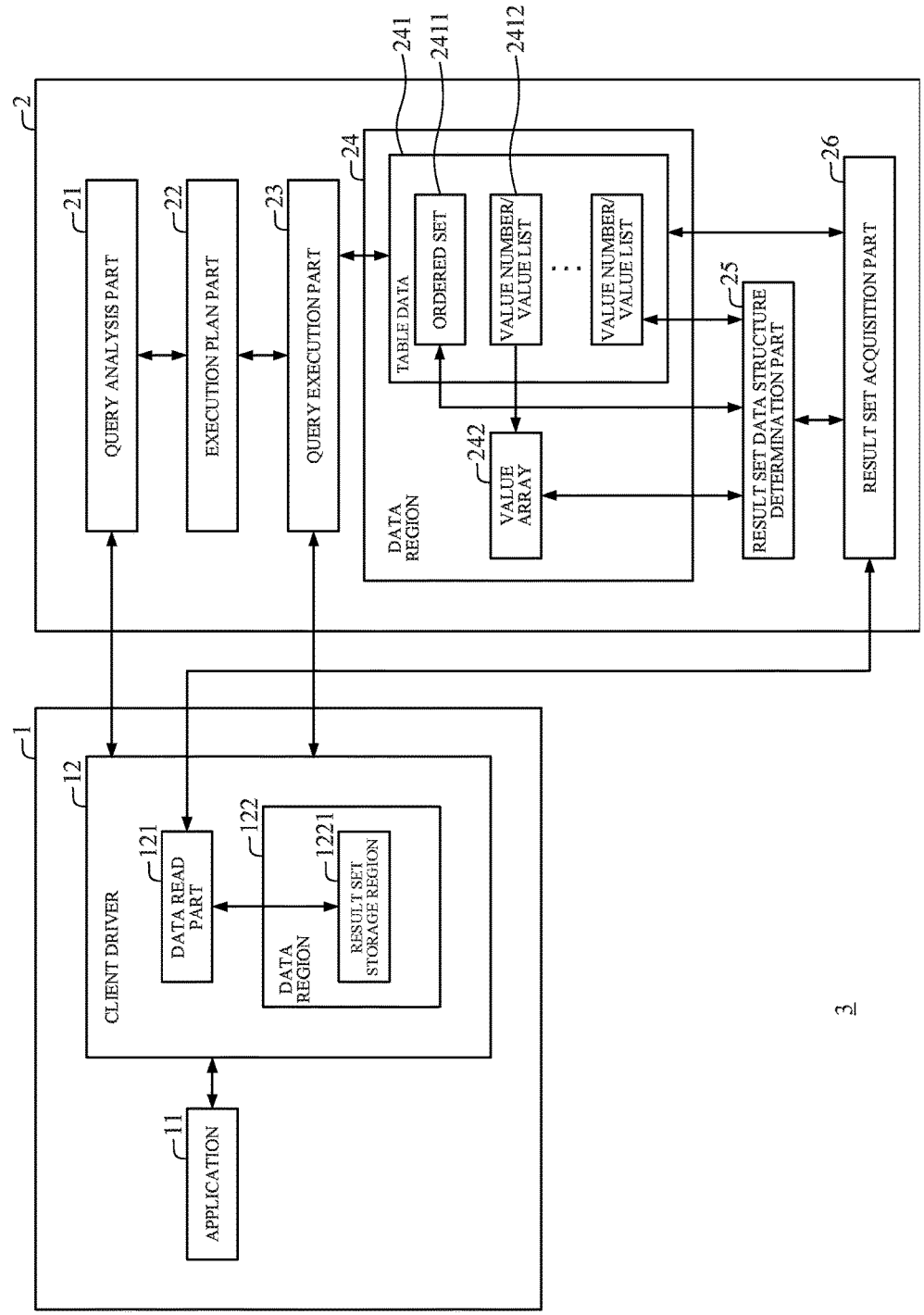
FIG. 2 is a block diagram showing a configuration of a client and a database server according to the first exemplary embodiment of the present invention.
Figure 4:
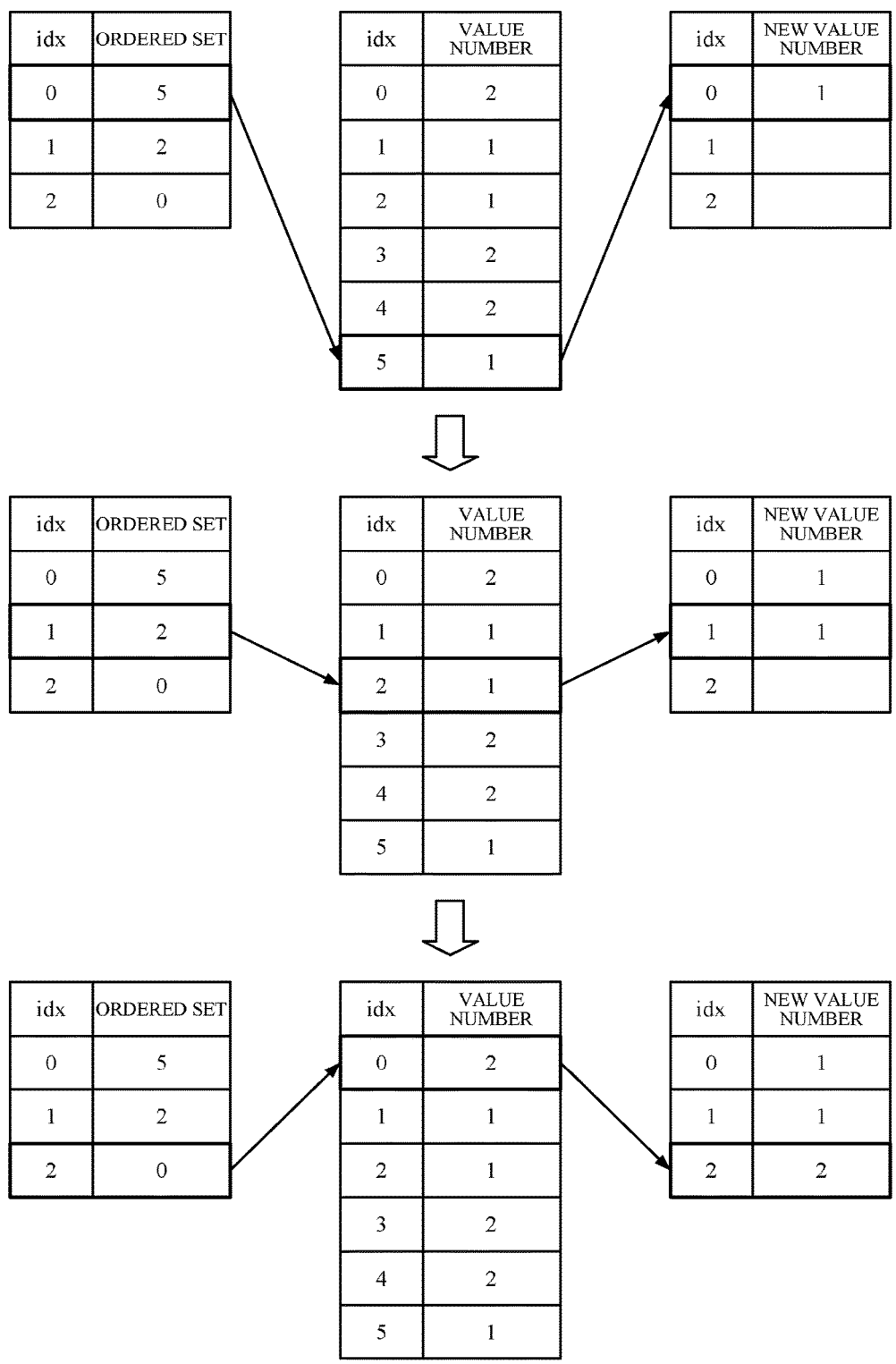
FIG. 4 is a diagram to explain recalculation processing of a value number which is performed in a case that a result set data structure determination part selects a data structure of a value number/value list.
Figure 5:
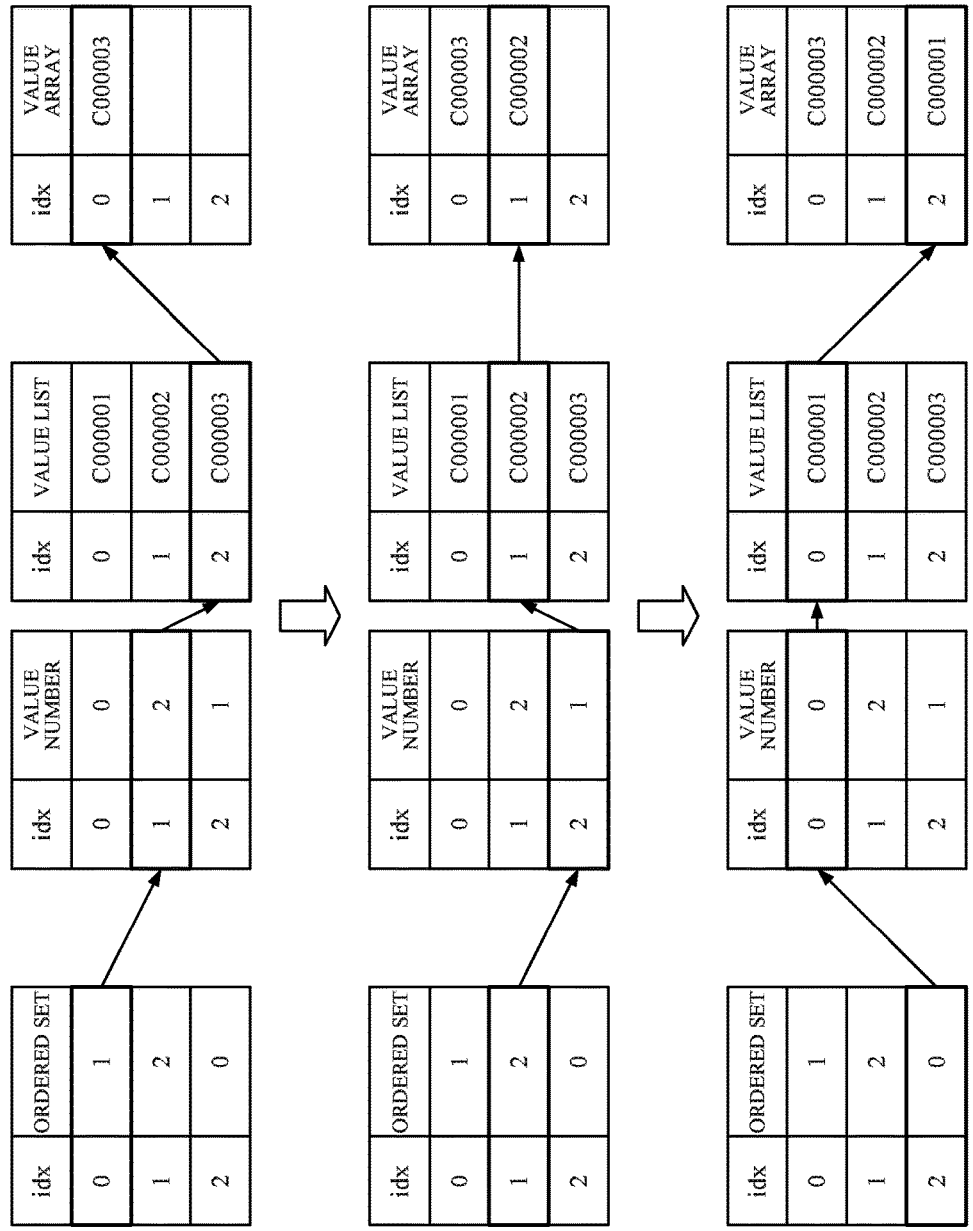
FIG. 5 is a diagram to explain generation processing of a value array which is performed in a case that a result set data structure determination part selects a data structure of a value array.
Figure 8:
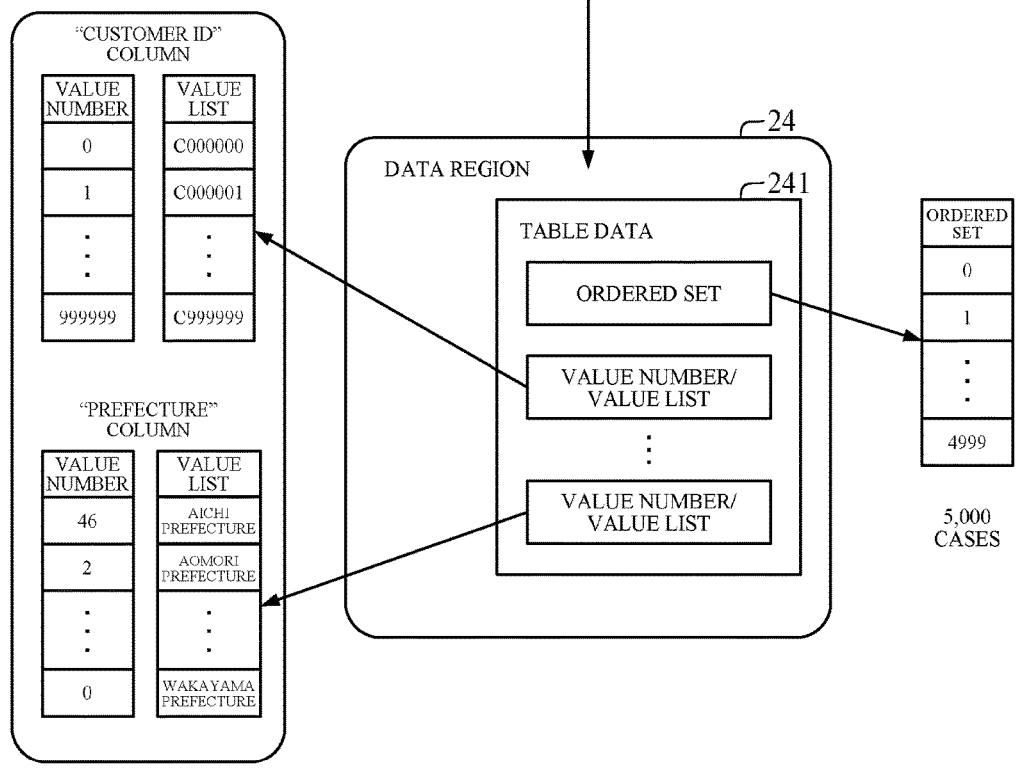
FIG. 8 is a diagram showing an example of a table of an execution result of a query.
Figure 9:
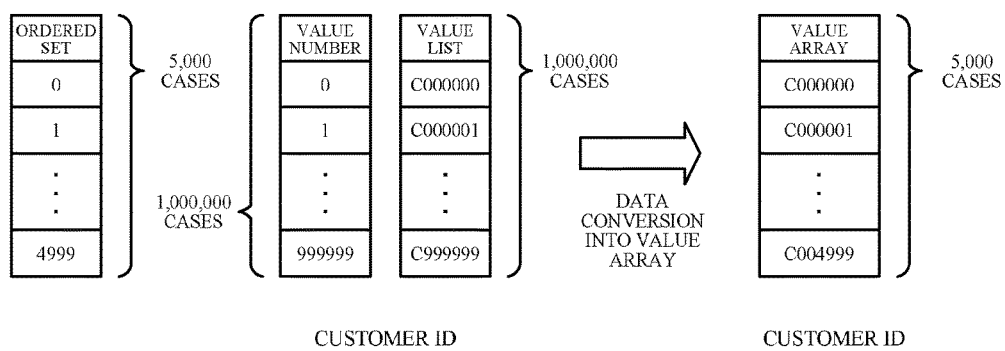
FIG. 9 is a diagram to explain calculation of a transfer cost and selection of a data structure that are performed by a result set data structure determination part.
Figure 10:
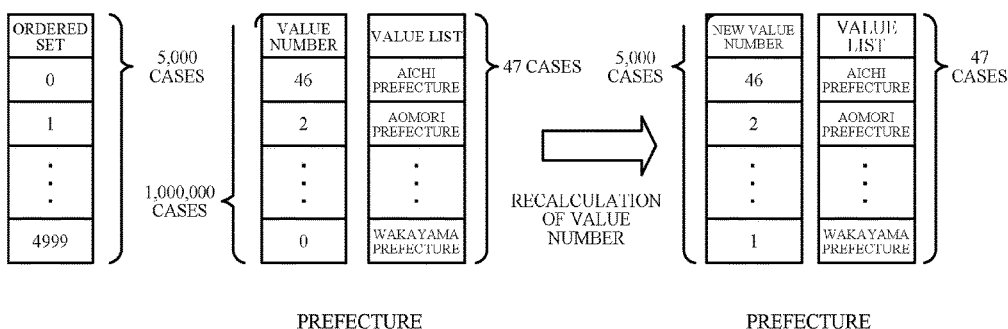
FIG. 10 is a diagram to explain calculation of a transfer cost and selection of a data structure that are performed by a result set data structure determination part.
Figure 11:
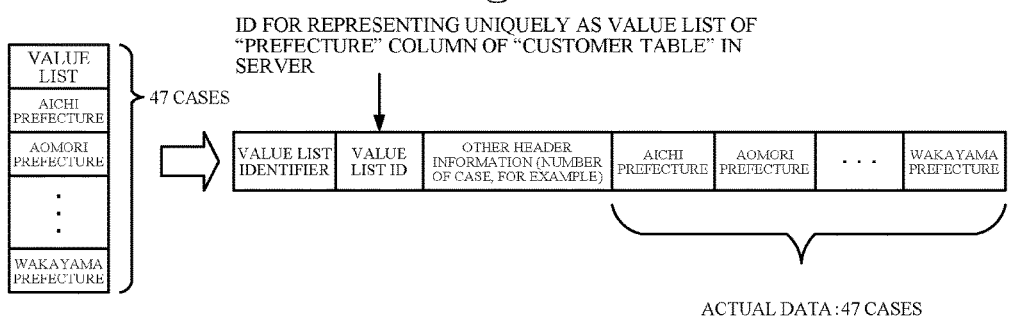
FIG. 11 is a diagram to explain header information added by a result set acquisition part.
Figure 12:
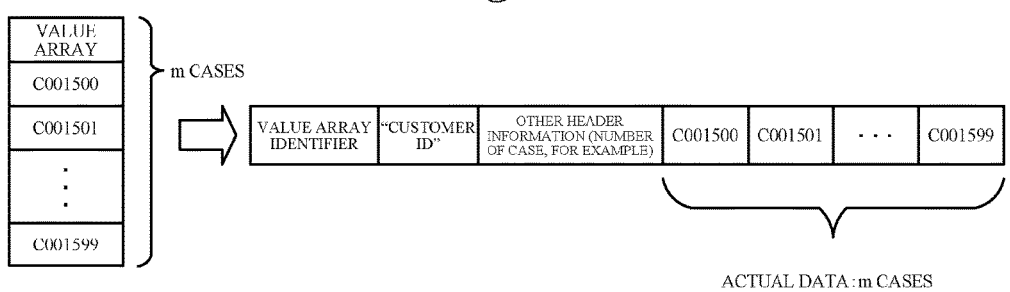
FIG. 12 is a diagram to explain header information added by a result set acquisition part.
Figure 13:
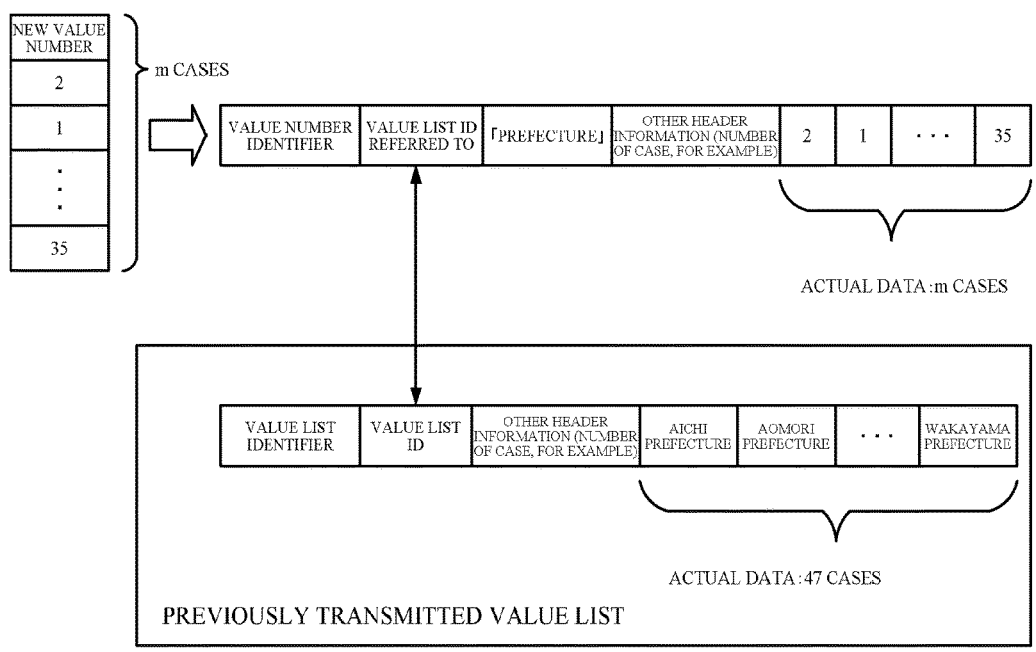
FIG. 13 is a diagram to explain header information added by a result set acquisition part.
Figure 14:
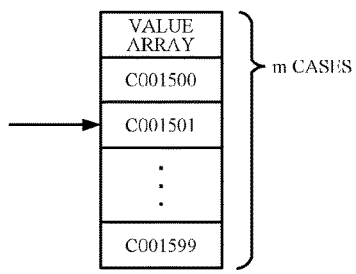
FIG. 14 is a diagram to explain an access method performed by a data read part to access data.
Figure 15:
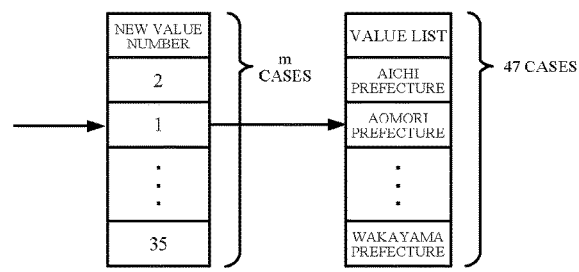
FIG. 15 is a diagram to explain an access method performed by a data read part to access data.
Figure 16:
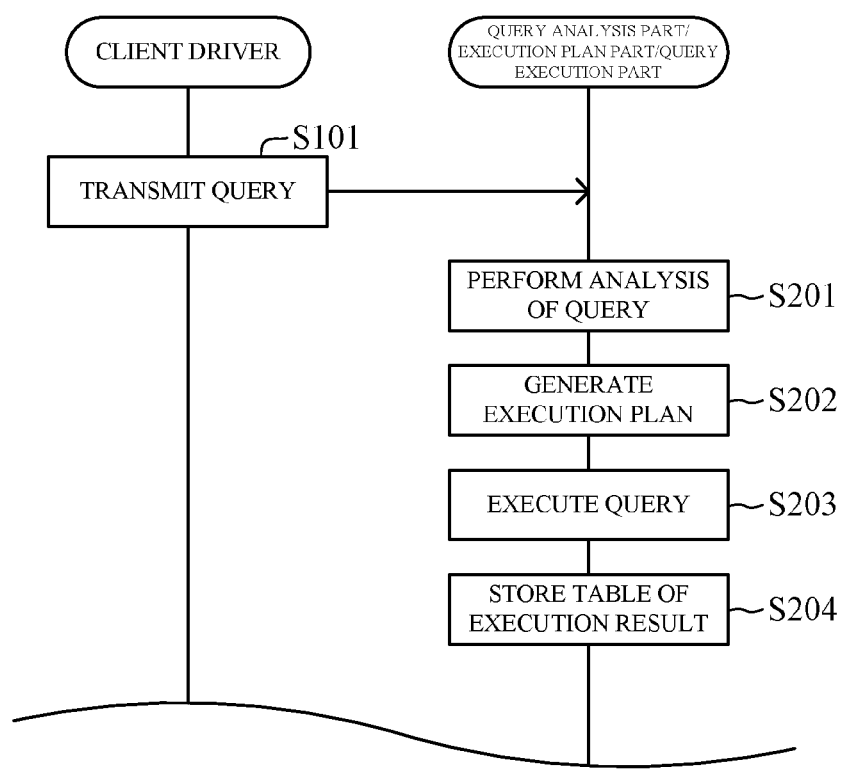
FIG. 16 is a sequence diagram showing an example of an operation of a database system for executing a query.
Figure 17:
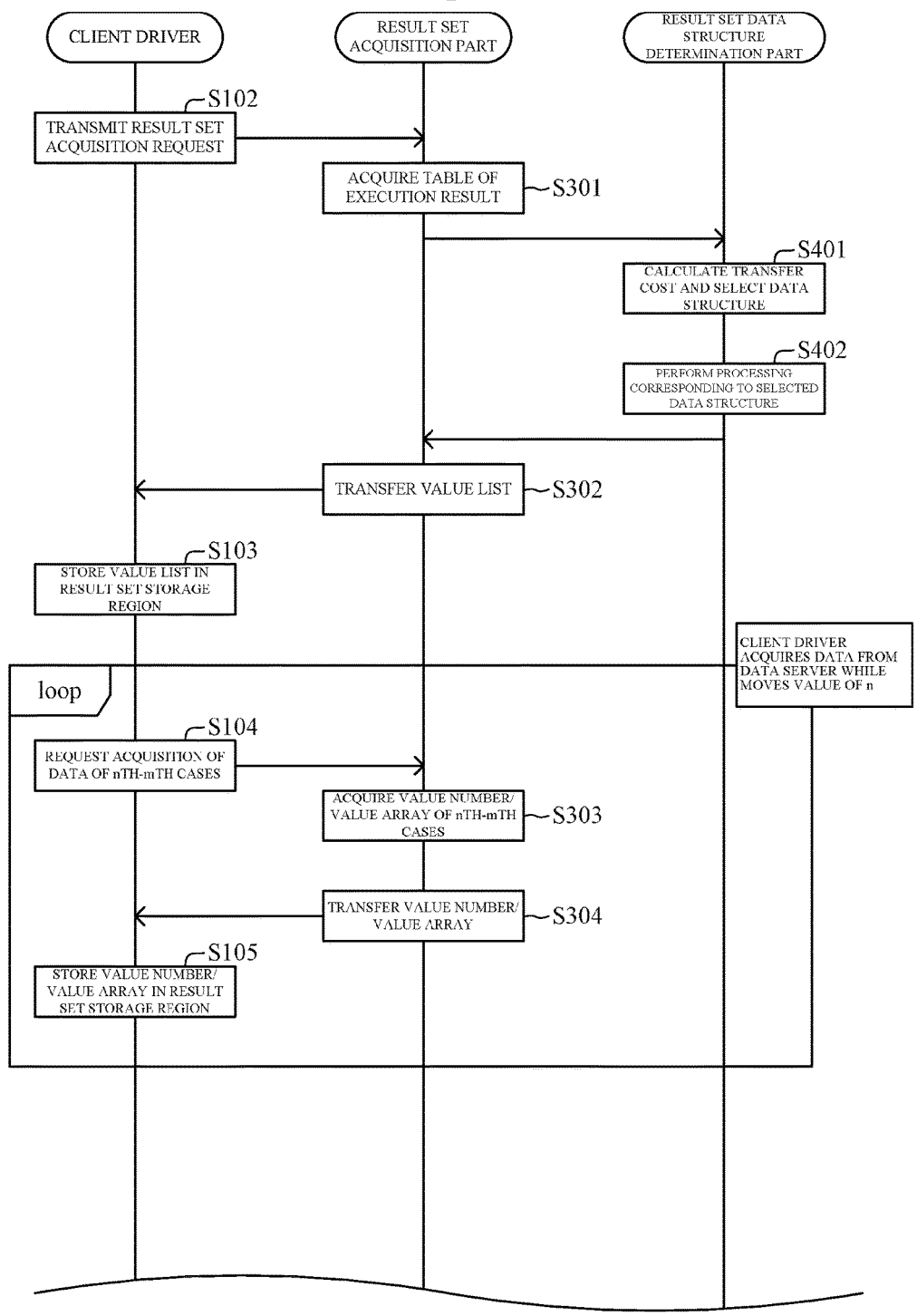
FIG. 17 is a sequence diagram showing an example of an operation of a client for acquiring a result set.
Figure 18:
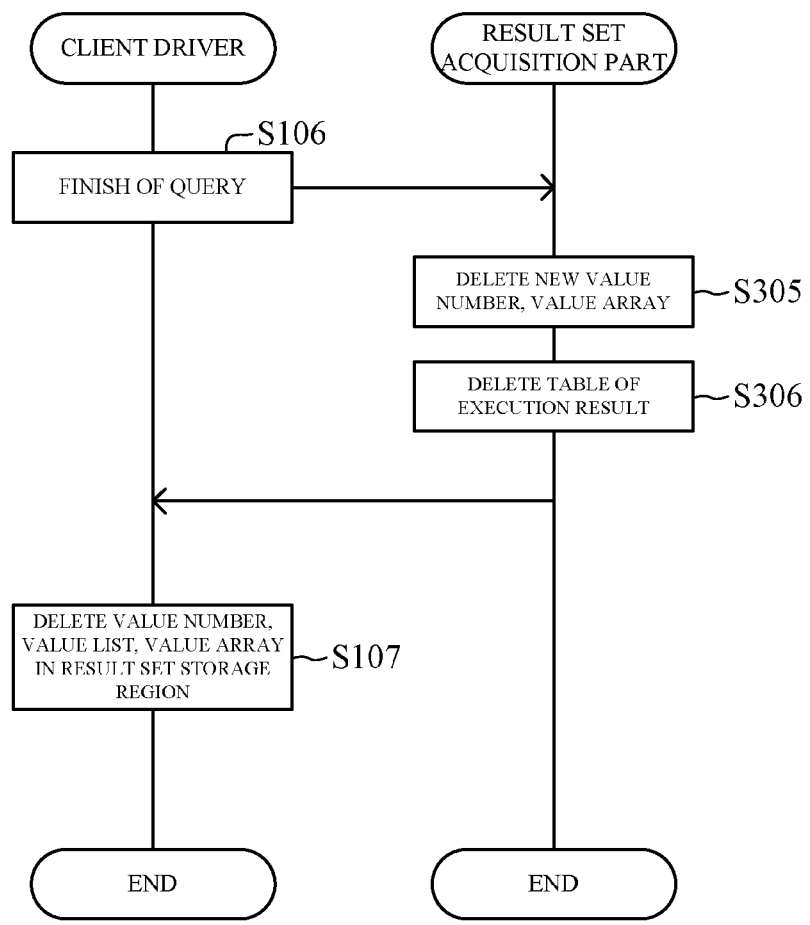
FIG. 18 is a sequence diagram showing an example of an operation of a database system at a time of finishing a query.

FIG. 1 is a block diagram showing an entire configuration of a database system 3. FIG. 2 is a block diagram showing a configuration of a client 1 and a database server 2. FIG. 3 is a diagram to explain a FAST structure (an ordered set 2411 and a value number/value list 2412). FIG. 4 is a diagram to explain recalculation processing of a value number which is performed in a case that a result set data structure determination part 25 selects a data structure of the value number/value list 2412. FIG. 5 is a diagram to explain generation processing of a value array 242 being performed in a case that the result set data structure determination part 25 selects a data structure of the value array 242. FIG. 6 is a flowchart to explain an entire operation of the database system 3. FIG. 7 is a diagram showing an example of a table stored in a data region 24 of the database server 2. FIG. 8 is a diagram showing an example of a table of an execution result of a query. FIGS. 9 and 10 are diagrams to explain calculation of a transfer cost and selection of a data structure that are performed by the result set data structure determination part 25. FIGS. 11-13 are diagrams to explain header information added by a result set acquisition part 26. FIGS. 14 and 15 are diagrams to explain an access method performed by a data read part 121 to access data. FIG. 16 is a sequence diagram showing an example of an operation of the database system 3 for executing a query. FIG. 17 is a sequence diagram showing an example of an operation of the client 1 for acquiring a result set. FIG. 18 is a sequence diagram showing an example of an operation of a database system at a time of finishing a query.

As shown in FIG. 1, in a first exemplary embodiment of the present invention, a database system 3 having a client 1 and a database server 2 will be explained. The client 1 transmits a query (an inquiry, a processing request) to the database server 2. When receiving a query from the client 1, the database server 2 executes the query and generates a table of an execution result of the query wherein an answer to each query is represented by a record (each line) in a FAST (Filter Array Structure) structure. Then, the database server 2 transmits the table of the execution result of the query to the client 1. As will be described later, when transmitting an execution result of a query having a plurality of columns, the database server 2 according to the present exemplary embodiment calculates respective data transfer costs in a plurality of data structures for each column of the table of the execution result. Then, the database server 2 selects a data structure for each column based on calculation results and transmits the table of the query for each column in the selected data structure.

Herein, the client 1 and the database server 2 are connected, for example, via a network, and configured to be capable of communicating with each other. Besides, number of the client 1 connected with the database server 2 may be one or more than one.

The client 1 is an information processing device. The client 1 has an arithmetic unit (a CPU: Central Processing Unit) (not shown), and a storage device. The client 1 is configured to realize an application 11 and a client driver 12 which will be described later by executing a program stored in the storage device by the CPU.

Referring to FIG. 2, the client 1 according to the present exemplary embodiment has the application 11 and the client driver 12.

The application 11 is an arbitrary application using the database server 2. The application 11 is a Java (a registered trademark) application, for example. Herein, the application 11 may be an application other than the Java application.

The client driver 12 is an interface between the application 11 and the database server 2. For example, the client driver 12 transmits a query or a result set acquisition request to the database server 2 in response to a request from the application 11. Meanwhile, for example, the client driver 12 receives a table of a result of a query from the database server 2 and transfers the table to the application 11. In this way, the client driver 12 is used when the application 11 uses the database server 2. The client driver 12 is a JDBC/ODBC (Open Database Connectivity) bridge driver, for example. Herein, the client driver 12 may be a driver other than the JDBC/ODBC driver.

As shown in FIG. 2, the client driver 12 has the data read part 121 and a data region 122.

The data read part 121 receives a table of an execution result of a query for each column from the database server 2. For example, the data read part 121 receives transferred data from the database server 2 in TCP/IP (Transmission Control Protocol/Internet Protocol). Then, the data read part 121 identifies a structure of the received data by referring to header information of the received data. After that, the data read part 121 stores the received data in (a result set storage region 1221 which will be described later of) the data region 122.

The data region 122 is a storage device such as a semiconductor memory. The data region 122 is provided with the result set storage region 1221. As described above, in the result set storage region 1221, data being received by the data read part 121 from the database server 2 is stored. The result set storage region 1221 is generated for each inquiry (query) by the client driver 12 and discarded by the client driver 12 at the same time of a finish of the inquiry, for example.

The database server 2 is an information processing device. The database server 2 has an arithmetic unit (a CPU: Central Processing Unit) (not shown), and a storage device. The database server 2 is configured to realize each function (each part) which will be described later by executing a program stored in the storage device by the CPU.

Referring to FIG. 2, the database server 2 has a query analysis part 21, an execution plan part 22, a query execution part 23, the data region 24, the result set data structure determination part 25, and the result set acquisition part 26.

The query analysis part 21 performs a syntax analysis of a query transmitted from the client driver 12. That is to say, the query analysis part 21 receives a query from the client driver 12. Then, the query analysis part 21 executes the syntax analysis of the received query. After that, the query analysis part 21 transmits an analysis result to the execution plan part 22.

The execution plan part 22 determines that by what order and method a query, the query on which the syntax analysis is executed by the query analysis part 21, can be performed efficiently, and prepares an execution plan of the query. Then, the execution plan part 22 transmits the prepared execution plan to the query execution part 23.

The query execution part 23 performs a data operation to the data region 24 in accordance with the execution plan prepared by the execution plan part 22. The query execution part 23 stores a table of an execution result of the query in the data region 24.

The data region 24 is a storage device such as a semiconductor memory or a disk device. In the data region 24, a table registered in a database of the database server 2, or a result of an inquiry to the database server 2 (a table of an execution result of a query by the query execution part 23) is stored as table data 241.

The table data 241 is configured by the ordered set 2411 and a plurality of the value number/value lists 2412. In this way, the database server 2 according to the present exemplary embodiment stores table data in the FAST structure.

The ordered set 2411 indicates a position of a value number in the value number/value list 2412 to be referred to. For example, an ordered set [1] with an index (idx) of the ordered set 2411 shown in FIG. 3 indicates that an index [1] in the value number/value list 2412 is referred to. That is to say, an element of the ordered set 2411 corresponding to a line number (an index of an ordered set) is equivalent to an index of a value number.

The value number/value list 2412 represents data by a combination of a value list and a value number, wherein the value list is a list of values and the value number indicates a corresponding position in the value list. For example, a value number [2] with an index [1] in the value number/value list 2412 in FIG. 3 indicates that the index [2] (value list=Z) in a value list is referred to in the value number/value list 2412. As such, an element of a value number indicates an index of a value list.

Herein, one ordered set 2411 is shown in FIG. 2, however, the ordered set 2411 may be a plurality of ordered sets.

Besides, the value array 242 can be stored in the data region 24. The value array 242 is data configured by an array of a value corresponding to a line number. The value array 242 is generated by the result set data structure determination part 25 from the ordered set 2411 and the value number/value list 2412. The details of the value array 242 will be described later.

The result set data structure determination part 25 calculates respectively a transfer cost representing an amount of data transfer by using each of a plurality of data structures for each column of a result set (a table of an execution result of a query executed by the query execution part 23). Then, based on the calculated transfer costs, the result set data structure determination part 25 determines what data structure will be used for transfer for each column of the result set respectively.

Specifically, the result set data structure determination part 25 estimates, for each column of a result set, total number of bytes of each of the value number/value list 2412 and the value array 242, and regards the estimated value as a transfer cost. That is to say, the result set data structure determination part 25 calculates a transfer cost in a case of using the value number/value list 2412 as a data structure and calculates a transfer cost in a case of using the value array 242 as a data structure. Then, the result set data structure determination part 25 selects a data structure of which the transfer cost is smaller than the other.

Meanwhile, upon selecting a data structure to be used for transfer, the result set data structure determination part 25 performs processing corresponding to the selected data structure.

For example, when selecting the value number/value list 2412, the result set data structure determination part 25 performs processing to make an index (idx) of a value number correspond to a line number. That is to say, as shown in FIG. 4, the result set data structure determination part 25 performs recalculation to make an element of a value number become an element of a value number being new (a new value number) when an element of the ordered set 2411 is an index. For example, referring to FIG. 4, when an element [5] of the ordered set 2411 having index [0] is an index, an element of a value number is [1]. Therefore, the result set data structure determination part 25 performs recalculation to make an element of a new value number having index [0] become [1]. By repeating such processing, the result set data structure determination part 25 makes an index of a value number correspond to a line number.

In this way, when selecting the value number/value list 2412, the result set data structure determination part 25 performs the processing to make an index (idx) of a value number correspond to a line number. By performing such the processing, it is not required to include the ordered set 2411 in a result set to be transferred.

Meanwhile, when selecting the value array 242, the result set data structure determination part 25 generates the value array 242 based on corresponding the value number/value list 2412. For example, referring to FIG. 5, the result set data structure determination part 25 obtains an element of a value number when an element of the ordered set 2411 corresponding to a line number is an index of the value number. Next, an element of a value list is obtained when the obtained value number is an index of the value list. Herein, each element of the value list represents actual data. Therefore, the result set data structure determination part 25 generates the value array 242 by adding the above described obtained element of the value list to the value array 242.

In this way, when selecting the value array 242, the result set data structure determination part 25 generates the value array 242 by adding each element of a value list so as to make a line number correspond to an index.

The result set acquisition part 26 accepts a result set acquisition request from the client driver 12. Meanwhile, the result set acquisition part 26 transfers a result set to the client driver 12 according to the result set acquisition request accepted from the client driver 12.

Specifically, the result set acquisition part 26 transmits a result set for each column according to the result set acquisition request. Meanwhile, when transmitting the result set for each column, the result set acquisition part 26 adds header information which includes identification information of a data structure being selected by the result set data structure determination part 25.

The above is an explanation of a configuration of the database system 3 according to the present exemplary embodiment. Next, processing performed by the database system 3 having the above described configuration will be explained with a specific example.

As shown in FIG. 6, processing by the database system 3 can be divided roughly into 3 parts, that is, execution of a query (step S001), acquisition of a result set (step S002) and a finish of a query (step S003). Processing of each part will be described below.

First, the execution of a query will be explained. This processing is similar to processing performed in a general relational database system.

That is to say, when the query analysis part 21 receives a query transmitted from the client driver 12, the query analysis part 21 executes a syntax analysis of the received query. After that, the query analysis part 21 transmits an analysis result to the execution plan part 22. Subsequently, the execution plan part 22 determines that by what order and method a query, the query on which the syntax analysis is executed by the query analysis part 21, can be performed efficiently, and prepares an execution plan of the query. Then, the execution plan part 22 transmits the prepared execution plan to the query execution part 23. After that, the query execution part 23 executes the query in accordance with the execution plan prepared by the execution plan part 22. By this, the query execution part 23 generates a table of an execution result of the query and stores the table in the table data 241 within the data region 24. Herein, the table of the execution result generated by the query execution part 23 has the FAST structure.

Specifically, for example, assume that a "customer table" shown by FIG. 7 is stored in the table data 241 of the database server 2. That is to say, as shown in FIG. 7, the customer table having 1,000,000 lines and columns representing such as customer IDs, family names, first names, prefectures, registration dates, updated dates are registered. Herein, assume that a query represented by a formula shown below is executed.

SELECT customer ID, prefecture FROM customer table WHERE registration date<'2009-01-01';

As a result of this, for example, the query execution part 23 stores a table of an execution result shown by FIG. 8 in the table data 241 within the data region 24 in the FAST structure. That is to say, for example, when the "customer table" has 5,000 pieces of data registered before Jan. 1, 2009, the query execution part 23 stores an ordered set representing 0-4,999. At this time, for a column representing customer IDs and for a column representing prefectures remain in their original table, and therefore the original customer table is referred to.

Next, acquisition of a result set will be explained.

When the result set acquisition part 26 receives a result set acquisition request from the client driver 12, the result set acquisition part 26 acquires a table of an execution result of a query accepted from the client driver 12.

For each column of the table of the execution result acquired by the result set acquisition part 26, the result set data structure determination part 25 calculates a transfer cost in a case of the value number/value list 2412 and calculates a transfer cost in a case of the value array 242. Then, the result set data structure determination part 25 selects one of them having a data structure of which the transfer cost is smaller than the other, and performs processing corresponding to the selected data structure.

For example, the result set data structure determination part 25 calculates respectively a transfer cost in a case of the value number/value list 2412 and a transfer cost in a case of the value array 242 by a formula shown below.

[Transfer Cost of Data Structure of Value Number/Value List]

> Number of byte of type of value number×number of element of ordered set+total number of byte of value list.

[Transfer Cost of Data Structure of Value Array]

> Number of element of ordered set×total number of byte of value list/number of element of value list.

Then, the result set data structure determination part 25 selects a data structure of which the transfer cost is smaller than the other, and performs processing corresponding to the selected data structure.

For example, when selecting the value number/value list 2412, the result set data structure determination part 25 performs processing to make an index (idx) of a value number correspond to a line number. That is to say, as shown in FIG. 4, the result set data structure determination part 25 performs recalculation to make an element of a value number become an element of a value number being new (a new value number) when an element of the ordered set 2411 is an index. Meanwhile, when selecting the value array 242, the result set data structure determination part 25 generates the value array 242 based on corresponding the value number/value list 2412. That is to say, as shown in FIG. 5, the result set data structure determination part 25 generates the value array 242 by adding each element of a value list so as to make a line number correspond to an index.

In this way, the result set data structure determination part 25 selects a data structure having a small transfer cost and performs prescribed processing.

Then, the result set acquisition part 26 transmits a value list of a column being selected as the value number/value list 2412 to the client driver 12. At this time, the result set acquisition part 26 adds a value list identifier and a value list ID, the value list identifier representing that data to be transferred is a value list, and the value list ID being capable of identifying uniquely a value list of a reference source table, as header information and transfers the value list to the client driver 12 (see FIG. 11).

After that, the data read part 121 of the client driver 12 reads header information of data transferred from the database server 2, and stores data identified as a value list in the result set storage region 1221 within the data region 122.

The above described processing will be described more specifically by using a case having a table of an execution result shown by FIG. 8, as an example of a table of an execution result. In this case, the result set data structure determination part 25 performs calculation of a transfer cost for a column representing customer IDs, for example, as shown below (see FIG. 9).

[Transfer Cost of Data Structure of Value Number/Value List]

Number of byte of type of value number×number of element of ordered set+total number of byte of value list =5,000×4+8,000,000=8,020,000.

[Transfer Cost of Data Structure of Value Array]

Number of element of ordered set×total number of byte of value list/number of element of value list =5,000×8,000,000/1,000,000=40,000.

According to the above calculation results of the transfer costs, the transfer cost of the data structure of the value array 242 is smaller than the transfer cost of the data structure of the value number/value list 2412. Therefore, as shown in FIG. 9, the result set data structure determination part 25 selects the data structure of the value array 242, and performs data structure conversion on the data array 242 based on the value number/value list 2412. Then, the result set data structure determination part 25 stores the converted value array 242 in the data region 24.

Meanwhile, in the case of the table of the execution result shown in FIG. 8, the result set data structure determination part 25 performs calculation of a transfer cost for a column representing prefectures, for example, as shown below (see FIG. 10).

[Transfer Cost of Data Structure of Value Number/Value List]

Number of Byte of Type Of Value Number×Number of Element of Ordered Set+Total Number of Byte of Value List =5,000×1+337=approximately 5,000.

[Transfer Cost of Data Structure of Value Array]

Number of element of ordered set×total number of byte of value list/number of element of value list =5,000×337/47=approximately 36,000.

In this case, the transfer cost of the data structure of the value number/value list 2412 is smaller than the transfer cost of the data structure of the value array 242. Therefore, as shown in FIG. 10, the result set data structure determination part 25 selects the data structure of the value number/value list 2412 and performs recalculation of a value number (calculation of a new value number).

Then, after the recalculation performed by the result set data structure determination part 25, the result set acquisition part 26 adds header information to a value list and transmits the value list to the client driver 12 as shown in FIG. 11. That is to say, the result set acquisition part 26 adds a value list identifier and a value list ID, the value list identifier representing that data to be transferred is a value list, and the value list ID being capable of identifying uniquely a value list of a reference source table, as the header information and transfers the value list to the client driver 12.

After that, from the header information of the received data, the data read part 121 of the client driver 12 confirms that a value list of the column representing the prefectures is transferred. Then, the data read part 121 stores the value list of the column representing the prefectures in the result set storage region 1221.

After a finish of transferring the value list described above, a phase to acquire actually data starts. That is to say, the client driver 12 acquires nth data from the database server 2 while moves a value of n representing an arbitrary number. In other words, the result set acquisition part 26 transfers an element of a value number of the value array 242 or of the value number/value list 2412 according to a request from the client driver 12.

For example, assume that the client driver 12 requests from nth to mth data of a result set to the database server 2.

At this time, for a column for which the value array 242 is selected, the result set acquisition part 26 transmits from nth to n+m−1th array data of the value array 242 to the client driver 12. Meanwhile, at this time, as shown in FIG. 12, the result set acquisition part 26 adds header information including a value array identifier being an identifier representing a value array, and transfers from the nth to n+m−1th array data of the value array 242 to the client driver 12.

On the other hand, in a case of a column for which the value number/value list 2412 is selected, a value list has already been transferred. Therefore, the result set acquisition part 26 transfers from nth to n+m−1th elements of a value number to the client driver 12. Meanwhile, at this time, as shown in FIG. 13, the result set acquisition part 26 adds header information including a value number identifier being an identifier representing a value number and an ID of a referred value list (a value list ID added to a header when the value list is sent), and transfers from the nth to n+m−1th elements of the value number to the client driver 12.

The data read part 121 refers to the header information of the received data and determines which of a value number and the value array 242 is transferred. Then, the data read part 121 stores the received data in the result set storage region 1221.

In the above described series of processing, the client driver 12 acquires data of a required line number by changing a value of n or m.

In the example shown in FIG. 8, from header information of received data, the data read part 121 can identify that a data structure of the column representing the customer IDs is the value array 242. Meanwhile, from header information of data, the data read part 121 can identify that a data structure of the column representing the prefectures is the value number/value list 2412.

Meanwhile, as shown in FIG. 14, when accessing the column representing the customer IDs having the data structure of the value array 242, the data read part 121 may access the received value array 242 as it is. Meanwhile, when accessing the column representing the prefectures having the data structure of the value number/value list 2412, the data read part 121 acquires, from the result set storage region 1221, a value list having the same ID as a value list ID used by the received value number. Then, as shown in FIG. 15, the data read part 121 can access the value list wherein from nth to n+m-1th value numbers (new value numbers) being received are indexes of the value list.

Next, a finish of a query will be explained.

When an instruction for finishing a query is made from the client driver 12, the result set acquisition part 26 of the database server 2 deletes a recalculated value number (a new value number), the value array 242, and a table of an execution result. Meanwhile, the client driver 12 of the client 1 deletes a value number, a value list, and the value array 242 stored in the result set storage region 1221.

In this way, along with a finish of a query, kinds of data generated by execution of the query is deleted.

Next, referring to FIGS. 16-18, an operation of the database system 3 will be explained.

First, referring to FIG. 16, an operation of the database system 3 in a case of executing a query will be explained.

Referring to FIG. 16, the client driver 12 transmits a query to the database server 2 according to a request from the application 11 (step S101).

The query analysis part 21 receives the query transmitted from the client driver 12. Then, the query analysis part 21 executes a syntax analysis of the received query (step S201). After that, the query analysis part 21 transmits an analysis result to the execution plan part 22.

Subsequently, the execution plan part 22 determines that by what order and method a query, the query on which the syntax analysis is executed by the query analysis part 21, can be performed efficiently, and prepares an execution plan of the query (step S202). Then, the execution plan part 22 transmits the prepared execution plan to the query execution part 23.

After that, the query execution part 23 executes the query in accordance with the execution plan prepared by the execution plan part 22 (step S203). By this, the query execution part 23 generates a table of an execution result of the query and stores the generated table of the execution result in the table data 241 within the data region 24 (step S204). Herein, the table of the execution result generated by the query execution part 23 has the FAST structure.

The database system 3 executes a query by the above described operation, for example. Next, referring to FIG. 17, an operation of the database system 3 in a case of acquiring a result set will be explained.

Referring to FIG. 17, the client driver 12 transmits a result set acquisition request to the result set acquisition part 26 of the database server 2 according to a request from the application 11 (step S102).

When receiving the result set acquisition request from the client driver 12, the result set acquisition part 26 acquires a table of an execution result of a query accepted from the client driver 12 with reference to the data region 24 (step S301).

Subsequently, for each column of the table of the execution result acquired by the result set acquisition part 26, the result set data structure determination part 25 calculates a transfer cost in a case of the value number/value list 2412 and calculates a transfer cost in a case of the value array 242. Then, the result set data structure determination part 25 selects one of them having a data structure of which the transfer cost is smaller than the other (step S401). After that, the result set data structure determination part 25 performs processing corresponding to the selected data structure (step S402).

Specifically, when selecting the value number/value list 2412, the result set data structure determination part 25 performs processing to make an index (idx) of a value number correspond to a line number. That is to say, as shown in FIG. 4, the result set data structure determination part 25 performs recalculation to make an element of a value number become an element of a value number being new (a new value number) when an element of the ordered set 2411 is an index. Meanwhile, when selecting the value array 242, the result set data structure determination part 25 generates the value array 242 based on corresponding the value number/value list 2412. That is to say, as shown in FIG. 5, the result set data structure determination part 25 generates the value array 242 by adding each element of a value list so as to make a line number correspond to an index.

Then, the result set acquisition part 26 transmits a value list of a column being selected as the value number/value list 2412 to the client driver 12 (step S302). At this time, the result set acquisition part 26 adds a value list identifier and a value list ID, the value list identifier representing that data to be transferred is a value list, and the value list ID being capable of identifying uniquely a value list of a reference source table, as header information and transfers the value list to the client driver 12.

After that, the data read part 121 of the client driver 12 reads header information of data transferred from the database server 2, and stores data identified as a value list in the result set storage region 1221 within the data region 122 (step S103).

When a value list is transferred by the above described operation, the client driver 12 requests from nth to mth data of a result set to the database server 2 (step S104). That is to say, the client driver 12 requests to acquire actual data.

When receiving a request to acquire data from the client driver 12, the result set acquisition part 26 acquires data corresponding to the request from the data region 24 (step S303), and transfer the data (step S304).

This operation performed by the result set acquisition part 26 is performed in accordance with a data structure of a target column. That is to say, the result set acquisition part 26 transmits, with respect to a column for which the value array 242 is selected, from nth to n+m-1th array data of the value array 242 to the client driver 12. Meanwhile, in a case of a column for which the value number/value list 2412 is selected, a value list has already been transferred, and therefore the result set acquisition part 26 transfers from nth to n+m-1th elements of a value number to the client driver 12.

After that, the data read part 121 refers header information of received data and determines which of a value number and the value array 242 is transferred. Then, the data read part 121 stores the received data in the result set storage region 1221 (step S105).

The database system 3 acquires a result set by the above described operation, for example. Next, referring to FIG. 18, an operation of the database system 3 at a time of finishing a query will be explained.

Referring to FIG. 18, the client driver 12 transmits an instruction for finishing a query to the result set acquisition part 26 of the database server 2 according to a request from the application 11 (step S106).

When receiving the above described instruction, the result set acquisition part 26 deletes a new value number being a recalculated value number and the value array 242 stored in the data region 24 (step S305). Meanwhile, the result set acquisition part 26 deletes a table of an execution result (the table data 241) from the data region 24 (step S306).

Meanwhile, the client driver 12 deletes a value number, a value list, and a value array stored in the result set storage region 1221 within the data region 122 (step S107).

The database system 3 finishes a query by the above described operation, for example.

As described above, the database server 2 according to the present exemplary embodiment has the result set data structure determination part 25. By such a configuration, for each column of a result set (a table of an execution result of a query executed by the query execution part 23), the result set data structure determination part 25 can calculates a transfer cost in a case of using a data structure of the value number/value list 2412 and a transfer cost in a case of using a data structure of the value array 242. Meanwhile, based on the calculation results of the transfer costs, the result set data structure determination part 25 can selects a data structure for transfer for each column. As a result of this, for each column, the database server 2 is capable of selecting a data structure of which a data transfer amount is small and transferring data. Thereby, the database server 2 can suppress increase of network traffic between a server and a client.

<Second Exemplary Embodiment>

In a second exemplary embodiment according to the present invention, a database system 5 which reuses a value list per connection will be explained. As shown in FIG. 19, there is a case where an identical value list is referred to by different inquiries when a plurality of inquiries are done by one connection. For example, in a case shown in FIG. 19, a value list of a column representing prefectures of an identical table is referred to by both of an inquiry 1 and an inquiry 2. In such the case, it is thought that, by storing a target value list in a client, it is not required to transfer again the value list from the database server 2 when transmitting a result of following inquiry. Therefore, in the present exemplary embodiment, the database system 5 configured to be able to prevent transmitting redundantly a value list will be explained. In following, for a similar configuration to the configuration described in the first exemplary embodiment, the same reference numeral as in the first exemplary embodiment will be used.

Figure 20:
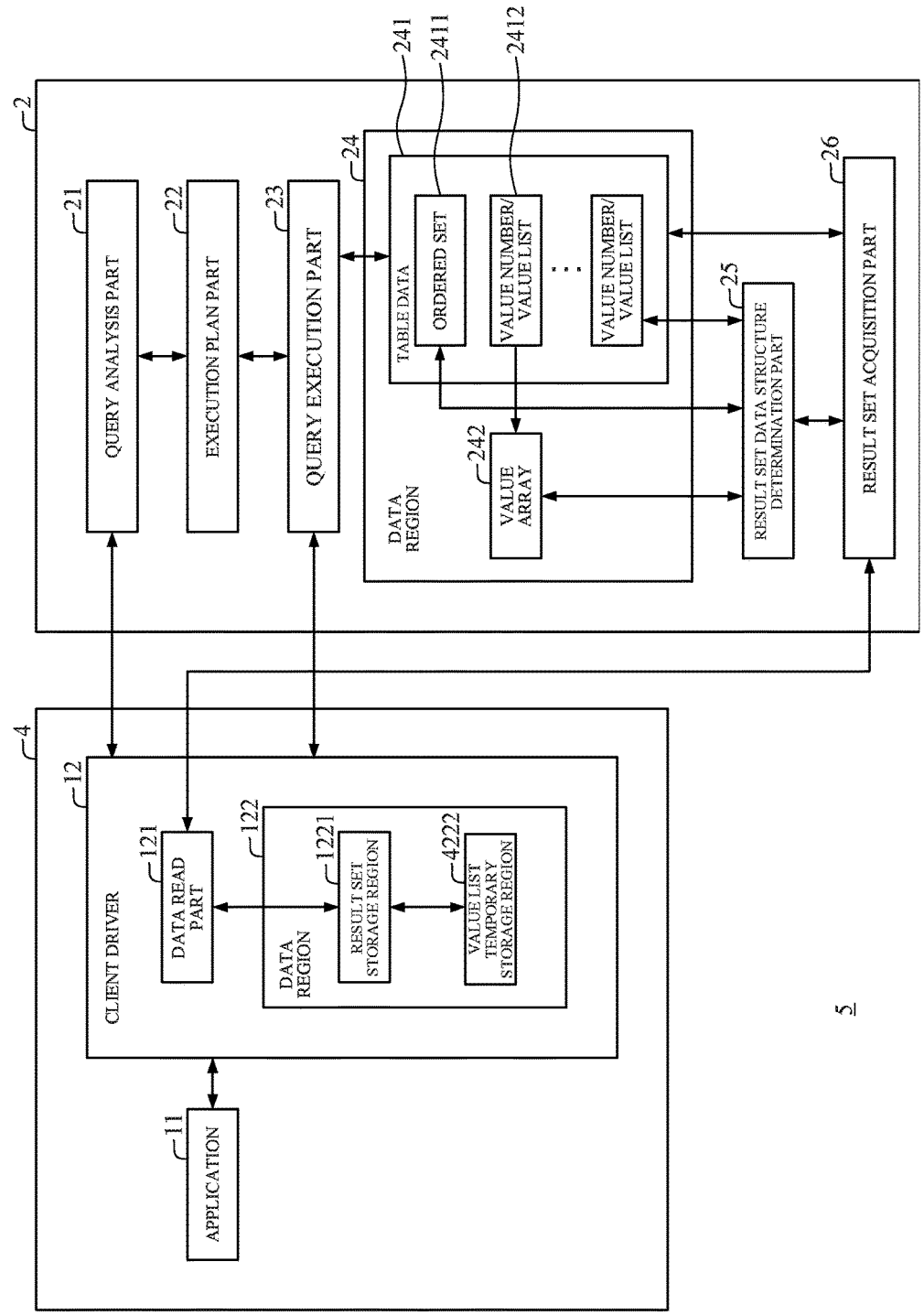
FIG. 20 is a block diagram showing a configuration of a client and a database server according to the second exemplary embodiment of the present invention.

Referring to FIG. 20, the database system 5 according to the present exemplary embodiment has a client 4 and the database server 2. The database system 5 of the present exemplary embodiment has a configuration being almost the same as the configuration of the database system 3 which was explained in the first exemplary embodiment.

That is to say, the database server 2 has the query analysis part 21, the execution plan part 22, the query execution part 23, the data region 24, the result set data structure determination part 25, and the result set acquisition part 26. Meanwhile, the client 4 has the application 11, the data read part 121, and the data region 122, and the data region 122 has the result set storage region 1221.

Further, the client 4 according to the present exemplary embodiment has a value list temporary storage region 4222. A characteristic configuration of the database system 5 will be explained below.

The value list temporary storage region 4222 is a region to store a value list referring to an existing table being held by the database server 2, among value lists transferred from the result set acquisition part 26 of the database server 2. That is to say, in the value list temporary storage region 4222, a value list is stored, the value list being not a value list generated during processing corresponding to a query, but being a value list referring to an existing table, among value lists transferred from the database server 2.

Content stored in the value list temporary storage region 4222 is configured not to be affected even if data of the result set storage region 1221 is discarded. That is to say, the content stored in the value list temporary storage region 4222 is not discarded at each time of finish of a query. The content stored in the value list temporary storage region 4222 is deleted by the client driver 12 when a connection between the client 4 and the database server 2 is disconnected, for example.

Herein, whether or not the value list temporary storage region 4222 stores a value list (whether or not a value list refers to an existing table) is confirmed by the client driver 12, by referring to header information being added when the result set acquisition part 26 transmits the value list, for example.

The client driver 12 according to the present exemplary embodiment receives a confirmation whether or not a value list of a target column has already been transmitted form the result set acquisition part 26. For example, the client driver 12 receives a value list ID of the value list of the target column from the result set acquisition part 26. Then, by referring to the value list temporary storage region 4222, the client driver 12 confirms whether or not the value list of the target column is stored in the value list temporary storage region 4222. That is to say, the client driver 12 checks whether a value list having the same ID as a value list ID being acquired from the result set acquisition part 26 is stored in the value list temporary storage region 4222. Then, the client driver 12 transmits a confirmation result to the result set acquisition part 26.

Meanwhile, when receiving a value list from the result set acquisition part 26, the client driver 12 determines, whether the received value list will be stored in the result set storage region 1221 or in the value list temporary storage region 4222, by referring to header information of the value list. For example, in a case of a value list referring to an existing table, the client driver 12 stores the value list in the value list temporary storage region 4222. Meanwhile, in a case of a value list being generated during processing, the client driver 12 stores the value list in the result set storage region 1221.

The result set data structure determination part 25 according to the present exemplary embodiment calculates respectively a transfer cost in a case of using the value number/value list 2412 and a transfer cost in a case of using the value array 242, for each column of a result set, with considering the value list being already transferred to the client driver 12. Then, the result set data structure determination part 25 determines what data structure is used for transfer for each column of the result set.

For example, when the result set data structure determination part 25 determines that a value list of a target column has already been transferred to the client driver 12 based on a confirmation result of a value list ID being received from the client driver 12, selects a data structure of the value number/value list 2412. Then, the result set data structure determination part 25 performs processing to make an index (idx) of a value number correspond to a line number.

In this case, a target value list has already been stored in the value list temporary storage region 4222 of the client driver 12. Therefore, transfer of the value list by the result set acquisition part 26 is omitted.

Meanwhile, for example, when determining that a value list of a target column has not been transferred to the client driver 12, the result set data structure determination 25 calculates a transfer cost in a case of a data structure of the value number/value list 2412 and a transfer cost in a case of a data structure of the value array 242. Then, based on the calculated transfer costs, the result set data structure determination part 25 selects a data structure having a smaller cost than the other.

Herein, when calculating a transfer cost of the value number/value list 2412, the result set data structure determination part 25 according to the present exemplary embodiment can perform calculation of the transfer cost in such a way that access frequency by a single connection to a target column increases, a cost decreases. For example, the result set data structure determination part 25 calculates a transfer cost of the value number/value list 2412 by using a formula shown below.

[Transfer Cost of Data Structure of Value Number/Value List]

Number of byte of type of value number×number of element of ordered set+total number of byte of value list/(1+access frequency to value list).

Meanwhile, the result set data structure determination part 25 calculates a transfer cost of the value array 242 by using the same formula as the formula explained in the first exemplary embodiment, for example.

After that, the result set data structure determination part 25 performs processing corresponding to the selected data structure.

For example, when selecting the value number/value list 2412, the result set data structure determination part 25 performs processing to make an index (idx) of a value number correspond to a line number. Meanwhile, in a case of selecting the value array 242, the result set data structure determination part 25 generates the value array 242 by adding each element of a value list so as to make a line number correspond to an index.

Upon receiving a result set acquisition request from the client driver 12, the result set acquisition part 26 transmits a value list ID corresponding to the value set acquisition request to the client driver 12. Thereby, the result set acquisition part 26 confirms whether or not a value list of a target column has already been transmitted to the client driver 12 (stored in the value list temporary storage region 4222).

Figure 21:
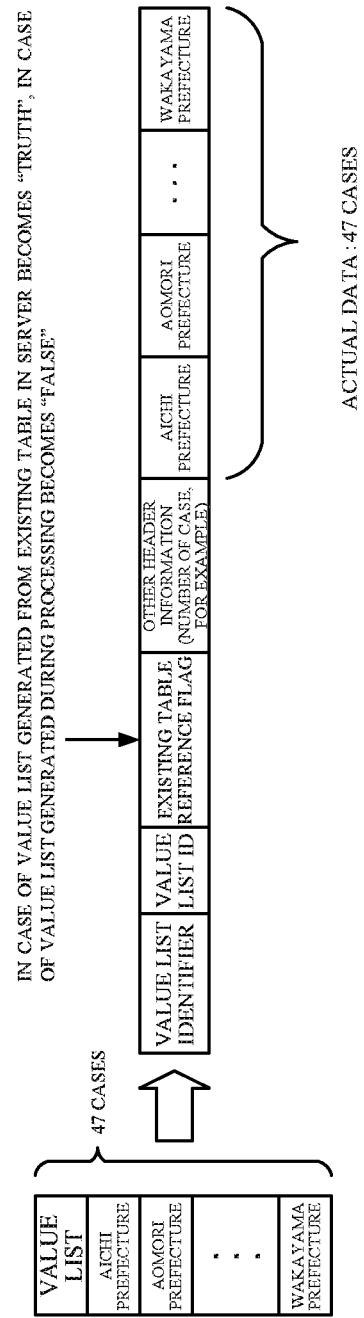
FIG. 21 is a diagram to explain header information added by a result set acquisition part.

Meanwhile, when transmitting a value list to the client driver 12, the result set acquisition part 26 adds a flag, the flag is to confirm whether or not a value list refers to an existing table, to header information of a value list to be transferred. That is to say, for example, as shown in FIG. 21, the result set acquisition part 26 performs transfer with adding a flag in addition to an ID specifying uniquely a value list, the flag being capable of identifying whether it is a value list referring to an existing table or it is a value list generated during processing, to header information of a value list. For example, the result set acquisition part 26 performs transfer with adding a "truth" existing table reference flag in a case of a value list being generated from evaluation existing in the server, or adding a "false" existing table reference flag in a case of a value list generated during processing, to header information of a value list.

Next, referring to FIGS. 22 and 23, a characteristic operation of the database system 5 will be explained.

Figure 22:
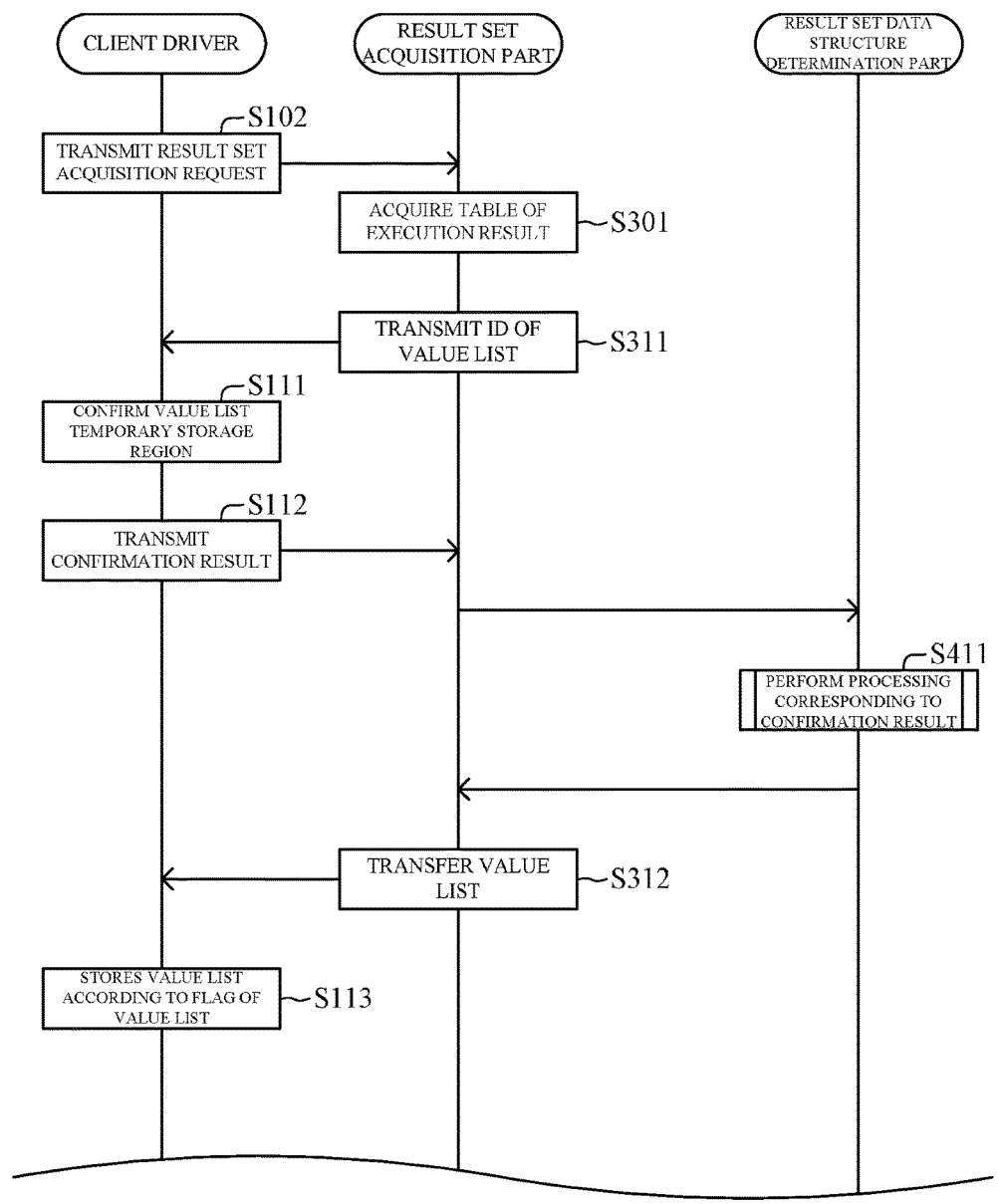
FIG. 22 is a sequence diagram showing an example of an operation of the database system according to the second exemplary embodiment.
Figure 23:
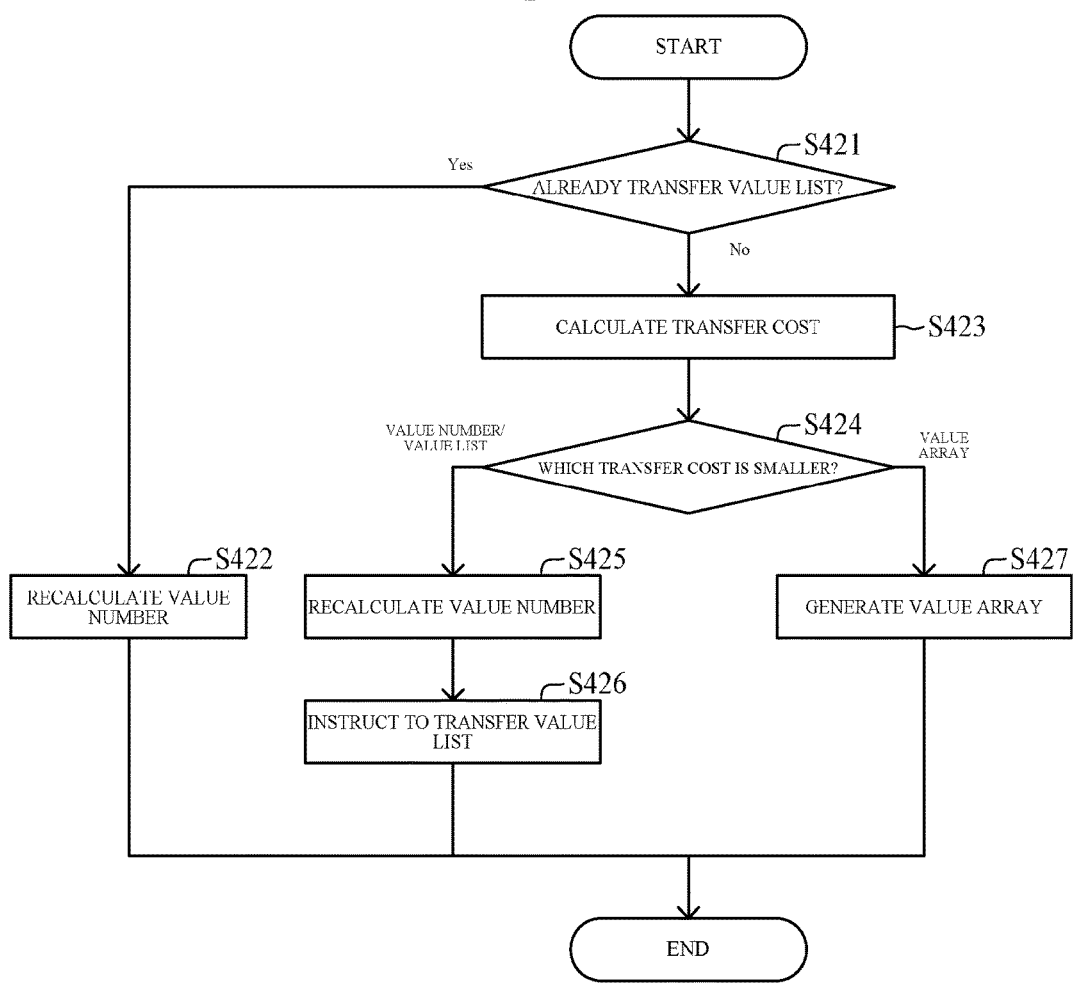
FIG. 23 is a flowchart showing an example of an operation of a result set data structure determination part according to the second exemplary embodiment for performing processing corresponding to a confirmation result of a value list ID.

Referring to FIG. 22, according to a result set acquisition request transmitted from the client driver 12 (step S102), the result set acquisition part 26 acquires a table of an execution result (step S301).

Subsequently, the result set data structure determination part 25 transmits a value list ID of a value list of a target column to the client driver 12 (step S311).

Upon receiving the value list ID, the client driver 12 confirms whether a value list having the same ID with the received value list ID is stored in the value list temporary storage region 4222 by referring to the value list temporary storage region 4222 (step S111). Then, the client driver 12 transmits a confirmation result to the result set acquisition part 26 (step S112).

The result set data structure determination part 25 selects a data structure to be used in transfer in accordance with the confirmation result by the client driver 12. Then, the result set data structure determination part 25 performs processing corresponding to the selected data structure (step S411).

After that, the result set acquisition part 26 transfers a value list of the value number/value list 2412 being selected based on calculation results of transfer costs to the client driver 12 (step S312). At this time, the result set acquisition part 26 adds a flag to header information, the flag is to confirm whether or not a value list refers to an existing table, and transfers the value list to the client driver 12.

Then, the client driver 12 stores the transferred value list in a position corresponding to the flag of the header information of the value list (step S113). For example, in a case of a value list referring to an existing table, the client driver 12 stores the value list in the value list temporary storage region 4222. Meanwhile, in a case of a value list generated during processing, the client driver 12 stores the value list in the result set storage region 1221.

Next, referring to FIG. 23, an operation of the step S411 will be explained in more detail.

Upon receiving a confirmation result transmitted from the client driver 12, the result set data structure determination part 25 determines whether or not a value list of a target column has already been transferred to the client driver 12 based on the confirmation result (step S421).

Then, in a case that the value list of the target column has already been transferred to the client driver 12 (the value list is stored in the value list temporary storage region 4222) (step S421, Yes), the result set data structure determination part 25 selects a data structure of the value number/value list 2412. Then, the result set data structure determination part 25 performs recalculation processing of a value number to make an index (idx) of the value number correspond to a line number (step S422).

Meanwhile, in a case that the value list of the target column has not already been transferred to the client driver 12 (step S421, No), the result set data structure determination part 25 calculates respectively a transfer cost in a case of using the value number/value list 2412 and a transfer cost in a case of using the value array 242 (step S423). Then, the result set data structure determination part 25 determines which of the transfer cost of the value number/value list 2412 and the transfer cost of the value array 242 is smaller than the other (step S424).

In a case that the transfer cost of the value number/value list 2412 is smaller than the transfer cost of the value array 242, the result set data structure determination part 25 selects the value number/value list 2412 as a data structure (step S424, value number/value list). Then, the result set data structure determination part 25 performs recalculation processing of a value number to make an index (idx) of the value number correspond to a line number (step S425). After that, the result set data structure determination part 25 instructs the result set acquisition part 26 to transfer the value list (step S426). As a result of this, to the client driver 12, the result set acquisition part 26 transfers the value list with adding a flag to header information, the flag is to confirm whether or not a value list refers to an existing table.

Meanwhile, in a case that the transfer cost of the value array 242 is smaller than the transfer cost of the value number/value list 2412, the result set data structure determination part 25 selects the value array 242 as a data structure (step S424, value array). Then, the result set data structure determination part 25 generates the value array 242 by adding each element of the value list so as to make a line number correspond to an index.

As described above, the client driver 12 according to the present exemplary embodiment has the value list temporary storage region 4222. Bu such a configuration, the client driver 12 can store a required value list in the value list temporary storage region 4222 where is not affected even if data in the result set storage region 1221 is discarded. Meanwhile, the database server 2 can selects a data structure with considering a value list stored in the value list temporary storage region 4222 of the client driver 12. Herein, data stored in the result set storage region 1221 is discarded along with a finish of a query, on the other hand, data stored in the value list temporary storage region 4222 is not discarded until a connection between the client 4 and the database server 2 is disconnected. Therefore, while a connection with the client 4 is maintained, the database server 2 can reuse a value list being already transferred. As a result of this, it is possible to achieve further restraint of increase of network traffic between a server and a client.

Meanwhile, the result set data structure determination part 25 calculates a transfer cost of the value number/value list 2412 in such a way that access frequency by a single connection to a target column increases more, a cost decreases more. By such a mechanism, in a case that access is frequently made, the value number/value list 2412 becomes likely to be selected. As a result of this, it is expected that it can achieve further restraint of increase of network traffic between a server and a client.

<Third Exemplary Embodiment>

In a third exemplary embodiment according to the present invention, a database system 7 configured to, in a case that a value list stored in the value list temporary storage region 4222 satisfies a prescribed condition, write out the value list to a storage device of a client will be explained. That is to say, the database system 7 according to the present invention is configured such that a value list is capable of being reused for not each connection but for each client. In following, for a similar configuration to the configurations described in the first and second exemplary embodiments, the same reference numeral as in these exemplary embodiments will be used.

Figure 24:
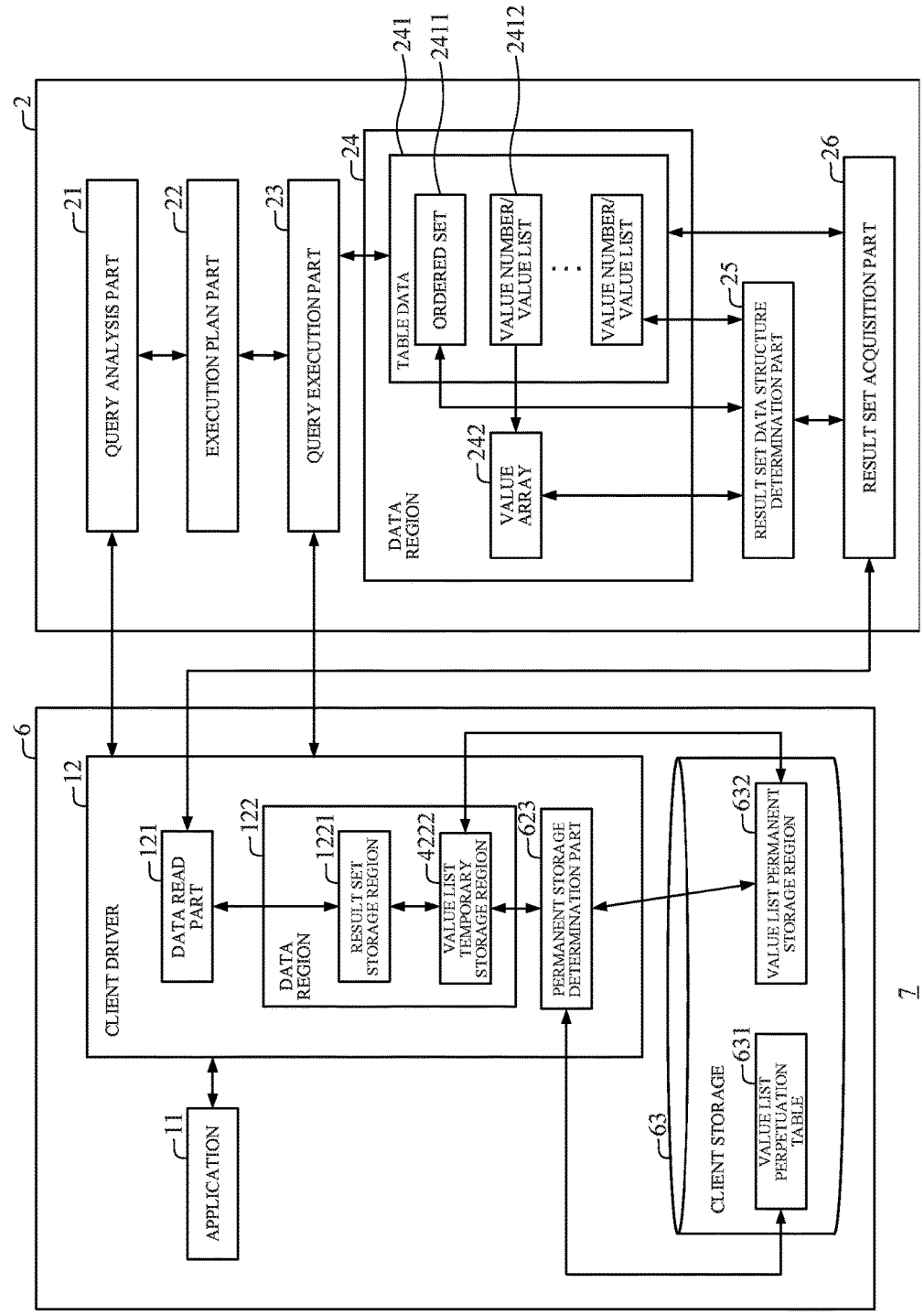
FIG. 24 is a block diagram showing a configuration of a client and a database server according to a third exemplary embodiment.

Referring to FIG. 24, the database system 7 according to the present exemplary embodiment has a client 6 and the database server 2. The database system 7 according to the present exemplary embodiment has a configuration being almost the same as the configuration of the database system 3 explained in the first exemplary embodiment and as the configuration of the database system 5 explained in the second exemplary embodiment.

That is to say, the database server 2 has the query analysis part 21, the execution plan part 22, the query execution part 23, the data region 24, the result set data structure determination part 25, and the result set acquisition part 26. Meanwhile, the client 4 has the application 11, the data read part 121, and the data region 122, and the data region 122 has the result set storage region 1221 and the value list temporary storage region 4222.

Further, the client 4 according to the present exemplary embodiment has a client storage 63. Meanwhile, the client storage 63 has a value list perpetuation table 631 and a value list permanent storage region 632. Meanwhile, the client driver 12 has a permanent storage determination part 623. A characteristic configuration of the database system 7 will be explained below.

The permanent storage determination part 623 monitors frequency of storing an identical value list in the value list temporary storage region 4222 by using the value list perpetuation table 631. Meanwhile, the permanent storage determination part 623 compares frequency of storing an identical value list in the value list temporary storage region 4222 with a predetermined perpetuation threshold value. Then, in a case that the frequency of storing the identical value list in the value list temporary storage region 4222 becomes the same as or more than the perpetuation threshold value, the permanent storage determination part 623 performs processing to write out the value list to the value list permanent storage region 632.

Meanwhile, in a case that a value list stored in the value list permanent storage region 632 is required, the permanent storage determination part 623 uploads the value list from the value list permanent storage region 632 to the value list temporary storage region 4222. For example, in accordance with a value list ID of a value list transmitted from the result set acquisition part 26, the permanent storage determination part 623 determines whether or not a value list corresponding to the value list ID is stored in the value list permanent storage region 632. Then, in a case that the value list is stored in the value list permanent storage region 632, the permanent storage determination part 623 uploads the value list from the value list permanent storage region 632 to the value list temporary storage region 4222.

The client driver 12 confirms whether or not a value list of a target column has already been transmitted, with considering a value list stored in the value list permanent storage region 632.

The client storage 63 is a storage device such as a disk device. The client storage 63 has the value list perpetuation table 631 and the value list permanent storage region 632.

The value list perpetuation table 631 is used by the permanent storage determination part 623 when counting frequency of storing an identical value list in the value list temporary storage region 4222.

Figures 25, 26:
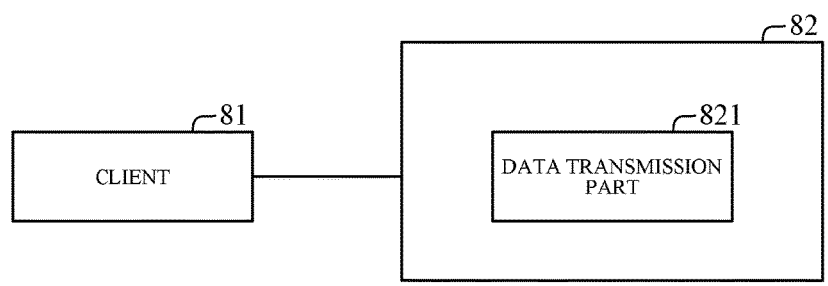
FIG. 25 is a diagram showing an example of a configuration of a value list perpetuation table.
FIG. 26 is a schematic block diagram showing an outline of a configuration of a database system according to a fourth exemplary embodiment.

FIG. 25 shows an example of a configuration of the value list perpetuation table 631. Referring to FIG. 25, the value list perpetuation table 631 has a value list ID, reference frequency, a perpetuation flag and a storing place of a value list, for example.

A value list ID represents an ID of a value list. The permanent storage determination part 623 updates reference frequency of the value list perpetuation table by using the value list ID.

By the permanent storage determination part 623, reference frequency is added by 1 for each time when an identical value list is stored in the value list temporary storage region 4222 by different connection. Therefore, for example, the permanent storage determination part 623 adds reference frequency by 1 for each time when a value list transferred from the result set acquisition part 26 is stored in the value list temporary storage region 4222. Meanwhile, the permanent storage determination part 623 adds reference frequency by 1 for each time when a value list is uploaded from the value list permanent storage region 632 to the value list temporary storage region 4222. For example, a first line in FIG. 25 (value list ID "AF6CD542 . . . ") indicates that number of frequency that a target value list is stored in the value list temporary storage region 4222 is 1.

A perpetuation flag is a flag becomes true when frequency of storing an identical value list in the value list temporary storage region 4222 is the same as or more than a perpetuation threshold value. As described above, the perpetuation flag is operated by the permanent storage determination part 623. For example, FIG. 25 shows that a perpetuation flag of a value list ID "972BC735 . . . " is true, and a perpetuation flag of a value list ID "D2690B43 . . . " is false. In this way, FIG. 25 shows a case that a perpetuation threshold value is 3. Herein, the perpetuation threshold value may be an arbitrary number. The perpetuation threshold value may be predetermined, or may be configured to be selected by a user.

A storage place of a value list indicates a position in which a target value list is written within the value list permanent storage region 632. As described above, the permanent storage determination part 623 writes out a value list having a perpetuation flag being true to the value list permanent storage region 632 and records a storage path of the value list in the value list perpetuation table 631. Therefore, a storage place of a value list having a perpetuation flag being false is blank.

In the value list permanent storage region 632, a value list is stored by the permanent storage determination part 623, the value list of which a perpetuation flag in the value list perpetuation table 631 is true. The value list stored in the value list permanent storage region 632 is written out to the value list temporary storage region 4222 as necessary by the permanent storage determination part 623.

As described, the client 6 according to the present exemplary embodiment has the permanent storage determination part 623, the value list perpetuation table 631 and the value list permanent storage region 632. By such a configuration, the permanent storage determination part 623 of the client 6 can count storage frequency of a value list being stored in the value list temporary storage region 4222 by using the value list perpetuation table 631. Meanwhile, based on storage frequency of a value list, when it is determined that usage frequency of the value list is large, the permanent storage determination part 623 can write out the value list stored in the value list temporary storage region 4222 to the value list permanent storage region 632. As a result of this, the value list written out to the value list permanent storage region 632 is not deleted but is stored continuously in the client 6 even if a query finishes, or even if a connection between the client 6 and the database server 2 finishes. Thereby, it is possible to share a value list even between different connections if the connections are of an identical client. As a result of this, it is possible to achieve further restraint of increase of network traffic between a server and a client.

<Fourth Exemplary Embodiment>

In a fourth exemplary embodiment according to the present invention, a database system 8 will be explained, the database system 8 has a client 81 executing an inquiry to a database server 82, and the database server 82 transmitting a table of an execution result in response to an inquiry from the client 81 wherein the table represents an answer to each inquiry as a record. In the present exemplary embodiment, an outline of a configuration of the database system 8 will be explained.

Referring to FIG. 26, the database system 8 has the client 81 and the database server 82.

The client 81 executes an inquiry to the database server 82.

The database server 82 has a data transmission part 821.

In a case of transmission of a table of an execution result having a plurality of columns, the data transmission part 821 performs the transmission for each column of the table of the execution result by using any of a predetermined plurality of data structures representing the column.

As described, the database server 82 of the database system 8 according to the present exemplary embodiment has the data transmission part 821. By such a configuration, in a case of transmission of a table of an execution result having a plurality of columns, the data transmission part 821 can perform the transmission for each column of the table of the execution result by using any of a predetermined plurality of data structures representing the column. As a result of this, the database server 82 can select, from consideration of such as a data transfer amount, a desirable data structure for each column of a table of an execution result, and transfer the table of the execution result for each column. Thereby, the database system 8 is possible to suppress increase of network traffic between a server and a client.

Meanwhile, an effect being similar to the effect performed by the above described database system 8 can be realized independently by the database server 82. Specifically, the database server 82 being another aspect of the present invention which, according to an inquiry from a client, transmits a table of an execution result of the inquiry, the table representing an answer to each inquiry as a record, and the database server 82 is configured to include a data transmission part which, in a case of transmission of a table of an execution result having a plurality of columns, performs the transmission for each column of the table of the execution result by using any of a predetermined plurality of data structures representing the column.

Meanwhile, the above described database server 82 can be realized by incorporating a prescribed program into the database server 82. Specifically, a program being another aspect of the present invention is a program comprising instructions for causing a database server that, according to an inquiry from a client, transmits a table of an execution result of the inquiry, the table representing an answer to each inquiry as a record, to realize a data transmission unit which, in a case of transmission of a table of an execution result having a plurality of columns, performs the transmission for each column of the table of the execution result by using any of a predetermined plurality of data structures representing the column.

Meanwhile, an information processing method executed by an operation of the above described database server 82 is a method comprises that, when performing transmission of a table of an execution result of the inquiry, according to an inquiry from a client, the table representing an answer to each inquiry as a record and having a plurality of column items, performing the transmission for each column of the table of the execution result by using any of a predetermined plurality of data structures being capable of representing the column.

Even the invention of a database server, a program or an information processing method having the above described configuration realizes a similar effect to the effect of the database system 8 described above, and thereby the above mentioned object of the present invention can be achieved.

<Supplementary Notes>

The whole or part of the above-described exemplary embodiments can be described as following supplementary notes. Hereinafter, the outlines of the configurations of such as a distributed processing control device according to the present invention will be described. However, the present invention is not limited to the configurations described below.

(Supplementary Note 1)

A database system comprising:

a client that executes a query to a database server; and the database server that, according to a query from the client, transmits a table of an execution result of the query, the table representing an answer to each query as a record and including the record; wherein the database server comprises a data transmission part which, in a case of transmission of the table of the execution result having a plurality of columns, performs the transmission for each column of the table of the execution result by using any of a plurality of data structures being capable of representing the column.

(Supplementary Note 2)

The database system according to supplementary note 1, wherein the data transmission part transmits data for each column of the table of the execution result, by using a data structure selected based on a data transfer amount in data transfer to the client by using each of the plurality of data structures.

(Supplementary Note 3)

The database system according to supplementary note 2, wherein the data transmission part transmits data for each column of the table of the execution result by using a data structure of which the data transfer amount is smallest among the plurality of the data structures.

(Supplementary Note 4)

The database system according to any of supplementary notes 1-3, comprising: a data structure selection part that calculates a transfer cost representing a data transfer amount of each of a plurality of data structures for each column of the table of the execution result and selects a data structure to be used in data transfer for each column based on the calculated transfer cost, wherein the data transmission part transmits data for each column by using the data structure selected by the data structure selection part for each column.

(Supplementary Note 5)

The database system according to supplementary note 4, wherein the data structure selection part calculates the transfer cost of a data structure in which data is represented by a combination of a value list and a value number, the value list being a list of values and the value number indicating a corresponding position in the value list, and calculates the transfer cost of a data structure in which data is configured by an array of a value corresponding to a line number, and selects a data structure to be used in data transfer for each column based on the calculated transfer costs.

(Supplementary Note 5-1)

The database system according to supplementary note 5, wherein in a case of selecting the data structure represented by the combination of the value list and the value number, the data structure selection part performs processing to make an index of the value number correspond to a line number.

(Supplementary Note 5-2)

The database system according to any of supplementary notes 4—5-1, wherein the data structure selection part calculates the transfer cost by calculating an estimated number of bytes for each of the data structures.

(Supplementary Note 5-3)

The database system according to any of supplementary notes 4—5-2, wherein the data structure selection part calculates the transfer cost based on the estimated number of bytes for each of the data structures and access frequency to data.

(Supplementary Note 6)

The database system according to any of supplementary notes 1-5, wherein the client comprises a temporary data storage part that stores temporarily data transmitted from the database server, and the data transmission part of the database server performs transmission by using any of the plurality of data structures being selected based on the data stored in the temporary data storage part.

(Supplementary Note 7)

The database system according to supplementary note 5, wherein in a case that the data stored in the temporary data storage part satisfies a prescribed condition, the client moves the data stored in the temporary data storage part to a storage device.

(Supplementary Note 8)

A database server that, according to a query from a client, transmits a table of an execution result of the query, the table representing an answer to each query as a record and including the record, the database server comprising:

a data transmission part that, in a case of transmission of the table of the execution result having a plurality of columns, performs the transmission for each column of the table of the execution result by using any of a plurality of data structures being capable of representing the column.

(Supplementary Note 8-1)

The database server according to supplementary note 8, wherein the data transmission part transmits data for each column of the table of the execution result, by using a data structure selected based on a data transfer amount in data transfer to the client by using each of the plurality of data structures.

(Supplementary Note 8-2)

The database server according to supplementary note 8 or 8-1, wherein the data transmission part transmits data for each column of the table of the execution result by using a data structure of which the data transfer amount is smallest among the plurality of the data structures.

(Supplementary Note 9)

An information processing method comprising:

when performing transmission of a table of an execution result of the query, according to a query from a client, the table representing an answer to each query as a record and including the record and comprising a plurality of column items, performing the transmission for each column of the table of the execution result by using any of a plurality of data structures being capable of representing the column.

(Supplementary Note 9-1)

The information processing method according to supplementary note 9, comprising:

transmitting data for each column of the table of the execution result by using a data structure selected based on a data transfer amount in data transfer to the client by using each of the plurality of data structures.

(Supplementary Note 9-2)

The information processing method according to supplementary note 9 or 9-1, comprising:

transmitting data for each column of the table of the execution result by using a data structure of which the data transfer amount is smallest among the plurality of the data structures.

(Supplementary Note 10)

A non-transitory computer-readable medium storing a program comprising instructions for causing a database server that, according to a query from a client, transmits a table of an execution result of the query, the table representing an answer to each query as a record and including the record, to realize:

a data transmission unit which, in a case of transmission of the table of the execution result having a plurality of columns, performs the transmission for each column of the table of the execution result by using any of a plurality of data structures being capable of representing the column.

(Supplementary Note 10-1)

The non-transitory computer-readable medium storing the program according to supplementary note 10, wherein the data transmission unit transmits data for each column of the table of the execution result by using a data structure selected based on a data transfer amount in data transfer to the client by using each of the plurality of data structures.

(Supplementary Note 10-2)

The program according to supplementary note 10 or 10-1, wherein the data transmission part transmits data for each column of the table of the execution result by using a data structure of which the data transfer amount is smallest among the plurality of the data structures.

The program described in the above mentioned Exemplary Embodiments and Supplementary Notes is stored in a storage device or a computer-readable storage medium. For example, the storage medium is a medium having portability such as a flexible disk, an optical disk, a magneto-optical disk and a semiconductor memory.

While the present invention has been described with reference to the exemplary embodiments described above, the present invention is not limited to the above-described embodiments. The configurations and details of the present invention can be changed within the scope of the present invention in various manners that can be understood by those skilled in the art.

DESCRIPTION OF REFERENCE NUMERALS 1, 4, 6 client
11 application
12 client driver
121 data read part
122 data region
1221 result set storage region
2 database server
21 query analysis part
22 execution plan part
23 query execution part
24 data region
241 table data
2411 ordered set
2412 value number/value list
242 value array
25 result set data structure determination part
26 result set acquisition part
3, 5, 7 database system
4222 value list temporary storage region
623 permanent storage determination part
63 client storage
631 value list perpetuation table
632 value list permanent storage region

The invention claimed is:

1. A database system comprising:
a database server comprising a memory storing instructions and at least one processor to process the instructions; and
a client configured to execute a query to the database server,
wherein the instructions stored in the memory of the database server are configured to cause the at least one processor to:
transmit, according the query from the client, a table of an execution result of the query, the table representing an answer to each query as a record and including the record;
implement a data transmission part configured to, in a case of transmission of the table of the execution result having a plurality of columns, perform the transmission for each column of the table of the execution result by using any of a plurality of data structures being capable of representing the column; and
implement a data structure selection part configured to calculate a transfer cost representing a data transfer amount of each of the plurality of data structures for each column of the table of the execution result, select a data structure to be used in data transfer for each column based on the calculated transfer cost, calculate the transfer cost of a data structure in which data is represented by a combination of a value list and a value number, the value list being a list of values and the value number indicating a corresponding position in the value list, calculate the transfer cost of a data structure in which data is configured by an array of a value corresponding to a line number, and select a data structure to be used in data transfer for each column based on the calculated transfer costs,
wherein the instructions stored in the memory of the database server are further configured to cause the at least one processor to control the data transmission part to transmit data for each column by using the data structure selected by the data structure selection part for each column.

2. The database system according to claim 1, wherein the instructions stored in the memory of the database server are further configured to cause the at least one processor to cause the data transmission part to transmit data for each column of the table of the execution result, by using a data structure selected based on a data transfer amount in data transfer to the client by using each of the plurality of data structures.

3. The database system according to claim 2, wherein the instructions stored in the memory of the database server are further configured to cause the at least one processor to cause the data transmission part to transmit data for each column of the table of the execution result by using a data structure of which the data transfer amount is smallest among the plurality of the data structures.

4. The database system according to claim 1, wherein the client comprises a temporary data storage configured to temporarily store data transmitted from the database server, and wherein the instructions stored in the memory of the database server are further configured to cause the at least one processor to cause the data transmission part of the database server to perform transmission by using any of the plurality of data structures being selected based on the data stored in the temporary data storage part.

5. The database system according to claim 4, wherein in a case that the data stored in the temporary data storage satisfies a prescribed condition, the client is configured to move the data stored in the temporary data storage to a storage device.

6. A database server that, according to a query from a client, transmits a table of an execution result of the query, the table representing an answer to each query as a record and including the record, the database server comprising:

a memory storing instructions; and at least one processor to process the instructions to implement:

a data transmission part configured to, in a case of transmission of the table of the execution result having a plurality of columns, perform the transmission for each column of the table of the execution result by using any of a plurality of data structures being capable of representing the column; and a data structure selection part configured to calculate a transfer cost representing a data transfer amount of each of the plurality of data structures for each column of the table of the execution result, select a data structure to be used in data transfer for each column based on the calculated transfer cost, calculate the transfer cost of a data structure in which data is represented by a combination of a value list and a value number, the value list being a list of values and the value number indicating a corresponding position in the value list, calculate the transfer cost of a data structure in which data is configured by an array of a value corresponding to a line number, and select a data structure to be used in data transfer for each column based on the calculated transfer costs, wherein the instructions stored in the memory of the database server are further configured to cause the at least one processor to control the data transmission part to transmit data for each column by using the data structure selected by the data structure selection part for each column.

7. An information processing method comprising:

when performing transmission of a table of an execution result of the query, according to a query from a client, the table representing an answer to each query as a record and including the record and comprising a plurality of column items, performing the transmission for each column of the table of the execution result by using any of a plurality of data structures being capable of representing the column;

calculating a transfer cost representing a data transfer amount of each of the plurality of data structures for each column of the table of the execution result;

selecting a data structure to be used in data transfer for each column based on the calculated transfer cost;

calculating the transfer cost of a data structure in which data is represented by a combination of a value list and a value number, the value list being a list of values and the value number indicating a corresponding position in the value list;

calculating the transfer cost of a data structure in which data is configured by an array of a value corresponding to a line number, and select a data structure to be used in data transfer for each column based on the calculated transfer costs; and transmitting data for each column by using the data structure selected for each column.

8. A non-transitory computer-readable medium storing a program comprising instructions for causing a database server that, according to a query from a client, transmits a table of an execution result of the query, the table representing an answer to each query as a record and including the record, to realize:

a data transmission unit configured to, in a case of transmission of the table of the execution result having a plurality of columns, performs the transmission for each column of the table of the execution result by using any of a plurality of data structures being capable of representing the column; and a data structure selection unit configured to calculate a transfer cost representing a data transfer amount of each of the plurality of data structures for each column of the table of the execution result, select a data structure to be used in data transfer for each column based on the calculated transfer cost, calculate the transfer cost of a data structure in which data is represented by a combination of a value list and a value number, the value list being a list of values and the value number indicating a corresponding position in the value list, calculate the transfer cost of a data structure in which data is configured by an array of a value corresponding to a line number, and select a data structure to be used in data transfer for each column based on the calculated transfer costs, wherein the instructions are further configured to cause the data transmission unit to transmit data for each column by using the data structure selected by the data structure selection unit for each column.

* * * * *